(12) United States Patent
Weiller et al.

(10) Patent No.: US 9,323,051 B2
(45) Date of Patent: Apr. 26, 2016

(54) SYSTEMS AND METHODS FOR INHIBITING CONTAMINATION ENHANCED LASER INDUCED DAMAGE (CELID) BASED ON FLUORINATED SELF-ASSEMBLED MONOLAYERS DISPOSED ON OPTICS

(71) Applicant: The Aerospace Corporation, El Segundo, CA (US)

(72) Inventors: Bruce H. Weiller, Santa Monica, CA (US); Jesse D. Fowler, El Segundo, CA (US); Randy M. Villahermosa, Pasadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 416 days.

(21) Appl. No.: 13/802,042

(22) Filed: Mar. 13, 2013

(65) Prior Publication Data

US 2014/0268335 A1    Sep. 18, 2014

(51) Int. Cl.
*G02B 1/00* (2006.01)
*G02B 27/00* (2006.01)

(52) U.S. Cl.
CPC ..... *G02B 27/0006* (2013.01); *Y10T 428/31663* (2015.04)

(58) Field of Classification Search
CPC .......... G02B 27/00; B05D 1/62; B05D 5/083; C23C 16/505; C23C 16/26
USPC ........ 359/507; 428/447; 427/580, 162, 255.6, 427/595
See application file for complete search history.

(56) References Cited

U.S. PATENT DOCUMENTS

| | | | |
|---|---|---|---|
| 4,560,576 | A | 12/1985 | Lewis et al. |
| 5,392,305 | A | 2/1995 | Jakobson |
| 5,472,748 | A | 12/1995 | Wolfe et al. |
| 5,513,198 | A | 4/1996 | Jakobson |
| 5,629,952 | A | 5/1997 | Bartholomew et al. |
| 5,770,473 | A | 6/1998 | Hall et al. |
| 5,851,674 | A | 12/1998 | Pellerite et al. |
| 5,989,654 | A | 11/1999 | Yoshioka et al. |
| 6,143,417 | A | 11/2000 | Nomura et al. |
| 6,620,333 | B2 | 9/2003 | Brusasco et al. |
| 6,642,066 | B1 | 11/2003 | Halliyal et al. |

(Continued)

OTHER PUBLICATIONS

Scurlock, "A phenomenological study of the effect of trace contaminants on lifetime reduction and laser-induced damage for optics," Proc. SPIE 5647:86-94 (2004).

(Continued)

*Primary Examiner* — Euncha Cherry
(74) *Attorney, Agent, or Firm* — Jones Day; Jaime D. Choi

(57) ABSTRACT

Embodiments of the present invention provide systems and methods for inhibiting contamination enhanced laser induced damage (CELID) based on fluorinated self-assembled monolayers (F-SAMs) disposed on optics. For example, a coating for inhibiting CELID to an optic disposed in a sealed gas environment or vacuum may include an F-SAM that includes a fluorinated hydrocarbon tail group covalently bound to the optic by a head group. The coating may be formed by heating the optic and a liquid-phase precursor of the F-SAM to generate a gas-phase precursor, and exposing the heated optic to the gas-phase precursor for a period of time sufficient for the gas-phase precursor to coalesce at and covalently bond to the optic and form the F-SAM. The optic may include silica, and the F-SAM may include a siloxane group covalently bound to the silica.

28 Claims, 16 Drawing Sheets

(56) References Cited

U.S. PATENT DOCUMENTS

| | | | |
|---|---|---|---|
| 7,018,709 | B2 | 3/2006 | Stevenson et al. |
| 8,252,208 | B2 | 8/2012 | Cole et al. |
| 2001/0050042 | A1 | 12/2001 | DeSimone et al. |
| 2002/0029956 | A1 | 3/2002 | Allen |
| 2002/0142493 | A1 | 10/2002 | Halliyal et al. |
| 2003/0066975 | A1 | 4/2003 | Okada |
| 2004/0112882 | A1 | 6/2004 | Miyairi et al. |
| 2004/0182416 | A1 | 9/2004 | Allen et al. |
| 2007/0097342 | A1 | 5/2007 | Gomei et al. |
| 2008/0132083 | A1 | 6/2008 | Matsuura |
| 2008/0160215 | A1* | 7/2008 | Crowder ............. B05D 1/62 427/580 |
| 2011/0236569 | A1 | 9/2011 | Weiller et al. |

OTHER PUBLICATIONS

Yogev et al., "Laser Chemical Process for Clean Applications in Semiconductor Manufacturing," Proc. SPIE 3933:77-88 (2000).
USPTO Final Office Action for U.S. Appl. No. 12/749,410, mailed Jun. 16, 2015 (14 pages).
USPTO Non-Final Office Action for U.S. Appl. No. 12/749,410, mailed Jan. 13, 2015 (24 pages).
USPTO Final Office Action for U.S. Appl. No. 12/749,410, mailed May 7, 2014 (17 pages).
USPTO Non-Final Office Action for U.S. Appl. No. 12/749,410, mailed Nov. 5, 2013 (8 pages).
USPTO Final Office Action for U.S. Appl. No. 12/749,410, mailed Jun. 5, 2013 (9 pages).
USPTO Non-Final Office Action for U.S. Appl. No. 12/749,410, mailed Jan. 3, 2013 (11 pages).
USPTO Notice of Allowance for U.S. Appl. No. 11/614,416, mailed Feb. 26, 2010 (5 pages).
Amendment After Final Office Action for U.S. Appl. No. 11/614,416, dated Feb. 3, 2010 (9 pages).
USPTO Final Office Action for U.S. Appl. No. 11/614,416, mailed Nov. 12, 2009 (5 pages).
Amendment for U.S. Appl. No. 11/614,416, dated Jun. 30, 2009 (18 pages).
USPTO Non-Final Office Action for U.S. Appl. No. 11/614,416, mailed Apr. 2, 2009 (7 pages).
Preliminary Amendment for U.S. Appl. No. 11/614,416, dated Dec. 21, 2006 (10 pages).
Arenberg et al., "On the role of water in the laser conditioning effect," ASTM International: 430-439 (1998).
Bien-Aime et al., "Impact of strorage induced outgassing organinc contamination on laser induced damage of silica optics at 351 nm," Optics Express, 17(21):18703-18713 (2009).
Chen et al., "Contamination control of space based laser instruments," SPIE 6291 (Optical Systems Degradation, Contamination, and Stray Light: Effects, Measurements, and Control II), 629104: pp. 1-12 (2006).
Crowder et al., "Mitigating Molecular and Particulate Contamination via Surface Energy," SPIE 7069 (Optical System Contamination: Effects, Measurements, and Control):706909-1 through 706909-9 (2008).
Hovis et al., "Optical damage at the part per million level: the role of trace contamination in laser induced optical damage," SPIE 2114 (Laser-Induced Damage in Optical Materials): 145-153 (1993).
Juha et al., "Fullerene decomposition induced by near-infrared laser radiation studied by real-time turbidimetry," Chemical Physics Letters 313:431-436 (1999).
Lien et al., "Contamination-induced degradation of space-horned lidars," Proc. 23rd ILRC, Nara:1-3 (2006).
Ling et al., "Comparative study of laser-induced damage of two reflective coatings in vacuum due to organinc contamination," Optik-Int. J. Light Electron Opt. 51815: 1-4 (2011).
Papernov et al., "Perfluorinated polymer films with extraordinary UV-laser damage resistance," SPIE 3244 (Laser-Induced Damage in Optical Materials:522-527 (1997).
Pareek et al., "Effect of oil vapor contamination on the performance of porous silica sol-gel antireflection-coated optics in vacuum spatial filters of high-power neodymium glass laser," Optical Engineering, 47(2):023801-1 though 023801-5 (2008).
Scurlock, "A Phenomenal Study of Contamination Enhanced Laser-Induced Damage in Sealed Lasers," 2004.
Schroder et al., "Investigation of UV laser induced depositions on optics under space conditions in presence of outgassing materials," Proc. 6th Int'l Conf. on Space Optics, ESTEC, Noordwijk: 1-4 (Jun. 2006).
Suratwala et al., "Surface chemistry and trimethylsilyl functionalization of Stober silica sols," Journal of Non-Crystalline Solids, 316:349-363 (2003).
Thomas et al., "A novel perfluorinated AR and protective coating for KDP and other optical materials," SPIE 1441 (Laser-Induced Damage in Optical Materials):294-303 (1990).
Thomas et al., "Method for Reducing the Effect of Environmental Contamination of Sol-gel Optical Coatings," Proc. SPIE 3492 (Third International Conference on Solid State Lasers for Application to Intertial Confinement Fusion):220-229 (1999).
Villahermosa et al., "Managing contamination-enhanced laser induced damage (CLID)" SPIE 7069 (Optical System Contamination: Effects, Measurements, and Control), 706908: pp. 1-9 (2008).
Vollmer et al., "Glass that cleans itself," Chemistry Material Sciences (2011).
Non final office action for U.S. Appl. No. 12/749,410 dated Jan. 3, 2013.
USPTO Non-Final Office Action for U.S. Appl. No. 12/749,410, mailed Oct. 28, 2015 (17 pages).

* cited by examiner

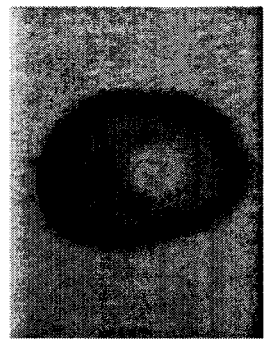
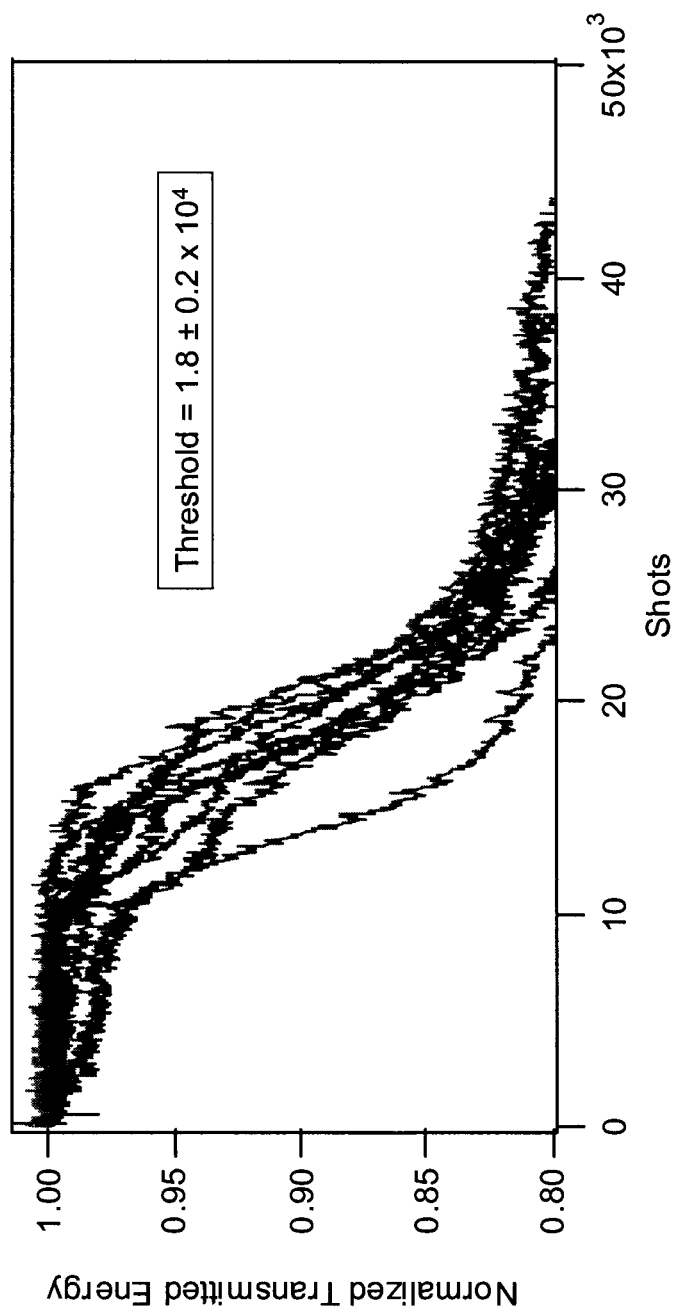
FIG. 9B
FIG. 9A

SYSTEMS AND METHODS FOR INHIBITING CONTAMINATION ENHANCED LASER INDUCED DAMAGE (CELID) BASED ON FLUORINATED SELF-ASSEMBLED MONOLAYERS DISPOSED ON OPTICS

FIELD OF THE INVENTION

This application generally relates to preventing or reducing contamination enhanced laser induced damage (CELID) to optics.

BACKGROUND OF THE INVENTION

It is well known that laser beams may in some circumstances damage optical materials and coatings. Referred to as laser induced damage (LID), it is believed that damage to optical materials may stem from the direct interaction of photons with the material. In particular, it is believed that the electric field component of the laser radiation may interact with surface defects, leading to thermal breakdown. The decomposition of the material may lead to pitting or carbon formation, which in turn may lead to increased material damage and rapid failure of the optic.

To mitigate LID, optical materials that are relatively tolerant to laser damage may be selected for use in laser technologies. After the optical materials are selected, screening tests that are specific to a particular system are conducted. Typically, the tests involve exposing an optic to laser radiation until damage occurs, and then repeating the tests multiple times to collect statistically meaningful information about the laser induced damage threshold (LIDT) of the optic. The LIDT of the optic is defined to be the number of pulses required to damage the optic, and is measured for a particular coating and optical material against a laser source that is representative of the hardware design (e.g., having the same fluence, wavelength, and pulse width). In some conditions, laser optic materials routinely survive a billion pulses or more.

One known cause of LID to an optic is molecular and particulate contamination. This contamination may result, for example, from outgassing products that condense onto the optic. Outgassing is the slow release of a gas that was frozen, trapped, absorbed, or adsorbed in some material. Common sources of gas include moisture, sealants, lubricants, plastics, and adhesives, but even metals and glasses can release gases from cracks or impurities. Contaminants, including outgassing products, may degrade optics by causing light transmission loss, increased light scatter, and/or obscuration. While the body of research on these contamination effects extends over multiple decades, a relatively new phenomenon of contamination enhanced laser induced damage (CELID or C-LID) has only recently gained attention.

CELID is generally observed when a laser and associated optics are enclosed in either a vacuum or sealed gas environment (typically nitrogen or air). As such, CELID is of particular concern during the development of space-based optical systems. Such optical systems are often developed first as a benchtop version that is a functional representation of the space-based version. The benchtop version, however, is not fully analogous to the space-based version, because the benchtop version is typically not enclosed in either a vacuum or sealed gas environment. Therefore, it is common for the benchtop version not to exhibit laser induced damage, and it is typically not until the space-based version is built and enclosed, presumably with the same optical design, that CELID becomes an issue. For example, it is believed that an open-environment benchtop version may not exhibit CELID because the contaminants, particularly molecular species, cannot build up in significant concentrations due to open circulation throughout the optical cavity of the benchtop system. In contrast, it is believed that the space-based version may exhibit CELID because of its vacuum or sealed gas environment. The implication is that standard practices for designing, building, and operating benchtop system to prevent CELID may not be fully applicable to space-based optical systems when operated in their flight enclosure, e.g., in a vacuum or sealed gas environment.

CELID may cause laser power to rapidly decay and lead to premature failure of optics. Encountered during the development of space-based lasers, such as the ones included on the National Aeronautics and Space Administration (NASA) Mars Orbiter Laser Altimeter (MOLA) and Geoscience Laser Altimeter System (GLAS) missions, CELID has also been observed in laboratory studies. In these reports, optics expected to survive well over 1 million pulses from an infrared laser were observed to fail in as few as 8,000 pulses when contamination was observed to be present.

Certain types of contaminants have been observed to cause CELID, resulting in accelerated damage to optics. The most common contaminants include hydrocarbons and silicones. The most widely studied contaminant for CELID is toluene, also known as methylbenzene. Toluene, a common outgassing compound of epoxies, is relatively volatile, and is a common chemical that has a similar chemical structure to a number of other aromatic hydrocarbon contaminants. Toluene has been observed to induce damage on optics, while some other contaminants such as acetone, a common optics cleaning solvent, have not been observed to induce similar damage.

Several previously-known systems attempt to address CELID. U.S. Pat. No. 5,770,473 to Hall et al. discloses a package for a high power semiconductor laser that includes a hermetically sealed container filled with a dry gaseous medium containing oxygen, for example air having less than 5000 ppm water. Hall discloses that the oxygen within the packaging atmosphere serves the important function of minimizing laser damage by organic impurities. Hall discloses that there is a downside to using oxygen, namely, that it can react with hydrogen to form water within the laser enclosure. Additionally, Hall discloses that the water, in turn, can adversely affect the overall operation of the electronic components within the enclosure, including the semiconductor laser, by, for example, creating a short circuit between the conductors which interconnect the components. Hall discloses that the use of a getter material that adsorbs or absorbs water in addition to organic impurities, such as porous silica and various zeolites, can help to minimize this problem.

Schröder et al., *Investigation of UV Laser Induced Depositions on Optics Under Space Conditions in Presence of Outgassing Materials*, 6th Int'l Conf. on Space Optics, held 27-30 Jun. 2006 at ESTEC, Noordwijk (2006) discloses that the outgassing of organic material under vacuum conditions combined with high laser fluences can lead to formation of deposits on the optics. Specifically, Schröder discloses an investigation of UV-laser induced deposits on uncoated fused silica optics in a test chamber under simulated space conditions in the presence of outgassing materials. Schröder discloses the use of a Nd:YAG laser and epoxy, silicone, and polyurethane contaminants in the investigation. Additionally, Schröder discloses that for testing the influence of water on the formation of deposits a liquid reservoir with about 50 ml was connected via a needle valve to the chamber, and that the partial pressure of the water vapor in the chamber was measured with a gas type independent capacitance sensor. Schröder discloses a test with an epoxy-based contaminant at a partial pressure of 5 mbar water and compared it with a test without water and stated that water reduced deposit formation significantly.

SUMMARY OF THE INVENTION

Embodiments of the present invention provide systems and methods for inhibiting contamination enhanced laser induced damage (CELID) based on fluorinated self-assembled monolayers (F-SAM) disposed on optics. The F-SAMs preferably are both hydrophobic and oleophobic so as to inhibit adsorption of contamination to the surface of the optic. Additionally, the F-SAMs substantially do not alter the reflection or transmission characteristics of the optic, but instead may significantly extend the expected lifetime of the optic within an enclosed gas environment or vacuum in which a bare optic may have a relatively short expected lifetime.

Under one aspect of the present invention, a coating is provided for inhibiting contamination enhanced laser induced damage (CELID) to an optic disposed in a sealed gas environment or vacuum. The coating includes an F-SAM that includes a fluorinated hydrocarbon tail covalently bound to the optic via a head group. The coating inhibits CELID to the optic.

Preferably, the coating is formed by heating the optic and a liquid-phase precursor of the F-SAM to generate a gas-phase precursor, and exposing the heated optic to the gas-phase precursor for a period of time sufficient for the gas-phase precursor to coalesce at and covalently bond to the optic and form the self-assembled monolayer.

Preferably, the coating has a contact angle with water of about 100 degrees or greater and a contact angle with toluene of about 50 degrees or greater.

In one embodiment, the optic comprises silica, and wherein the fluorinated hydrocarbon comprises a siloxane group covalently bound to the silica.

The tail group may have the general structure:

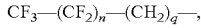

where n is zero or an integer and q is zero or an integer. The value of n may be between zero and twenty, and q may be between zero and twenty, and n+q may be twenty or less. For example, n may be between five and ten, and q may be between two and four.

Under another aspect of the present invention, a system with enhanced resistance to CELID may include a housing defining a sealed gas environment or vacuum; a laser defining an optical path through the sealed gas environment or vacuum; an optic disposed within the housing and in the optical path of the laser; and a coating that includes an F-SAM. The F-SAM may include a fluorinated hydrocarbon tail covalently bound to the optic by a head group. The coating inhibits CELID to the optic.

The system further may include a container configured to introduce a gas phase additive to the sealed gas environment or vacuum in an amount sufficient to further inhibit contamination enhanced laser induced damage to the optic. Exemplary gas phase additives include water or an alcohol.

Under another aspect of the present invention, a method for inhibiting contamination CELID to an optic includes disposing on the optic a coating including an F-SAM that includes a fluorinated hydrocarbon tail group covalently bound to the optic via a head group. The method further may include disposing the optic with the coating disposed thereon within a housing defining a sealed gas environment or vacuum and along an optical path of a laser, and transmitting light from the laser through or reflecting light from the laser from the optic with the coating disposed thereon substantially without CELID.

In one embodiment, the coating is disposed on the optic by heating the optic and a liquid-phase precursor of the F-SAM to generate a gas-phase precursor, and exposing the heated optic to the gas-phase precursor for a period of time sufficient for the gas-phase precursor to coalesce at and covalently bond to the optic and form the F-SAM. The liquid-phase precursor may have the general structure:

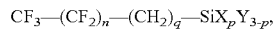

where n is zero or an integer, q is zero or an integer, X is an alkoxy group, Y is a halogen, and p is zero or an integer between one and three. The value of n may be between zero and twenty, q may be between zero and twenty, and n+q may be twenty or less. For example, n may be between five and ten, q may be between two and four, Y may be Cl, and p may be zero.

BRIEF DESCRIPTION OF THE DRAWINGS

FIG. 9A is a plot illustrating the normalized transmitted energy for a series of threshold measurements performed on a bare fused silica optic exposed to toluene in synthetic air.

FIG. 9B is an image of a damaged site produced on the optic from one threshold measurement described in FIG. 9A.

DETAILED DESCRIPTION

Although techniques to mitigate laser induced damage (LID) have been implemented in the past, these techniques may not be applicable or sufficient to prevent or reduce contamination enhanced laser induced damage (CELID) to optics in a vacuum or sealed gas environment, e.g., optics in a space-based laser when operated in its flight enclosure. The present inventors have recognized that covalently bonding a self-assembled monolayer of a fluorinated hydrocarbon, or F-SAM, to an optic to be disposed in the optical path of a laser may prevent or reduce CELID. Specifically, the F-SAM may be both hydrophobic and oleophobic, and thus may inhibit binding of both hydrophilic and oleophilic contaminants to the surface of the optic. For example, the F-SAM may include a relatively tightly packed arrangement of partially or fully fluorinated hydrocarbon chain tail groups, each of which is covalently bonded to the surface of the optic via a head group, and which collectively inhibit adsorption of contaminants to the optic. Preferably, the F-SAM substantially covers the surface of the optic, leaving substantially no areas for contaminants to adsorb to the surface. The F-SAM thus may reduce or eliminate degradation of the optic through mechanisms such as light transmission loss, increased light scatter, and obscuration. The inhibited degradation may result in longer life for the optic.

First, an exemplary method for inhibiting CELID to an optic will be described, along with F-SAMs that may be formed using such a method. Then, systems for inhibiting CELID to an optic will be described. Lastly, some experimental results demonstrating the effectiveness of F-SAMs in inhibiting CELID will be described.

Figure 1:
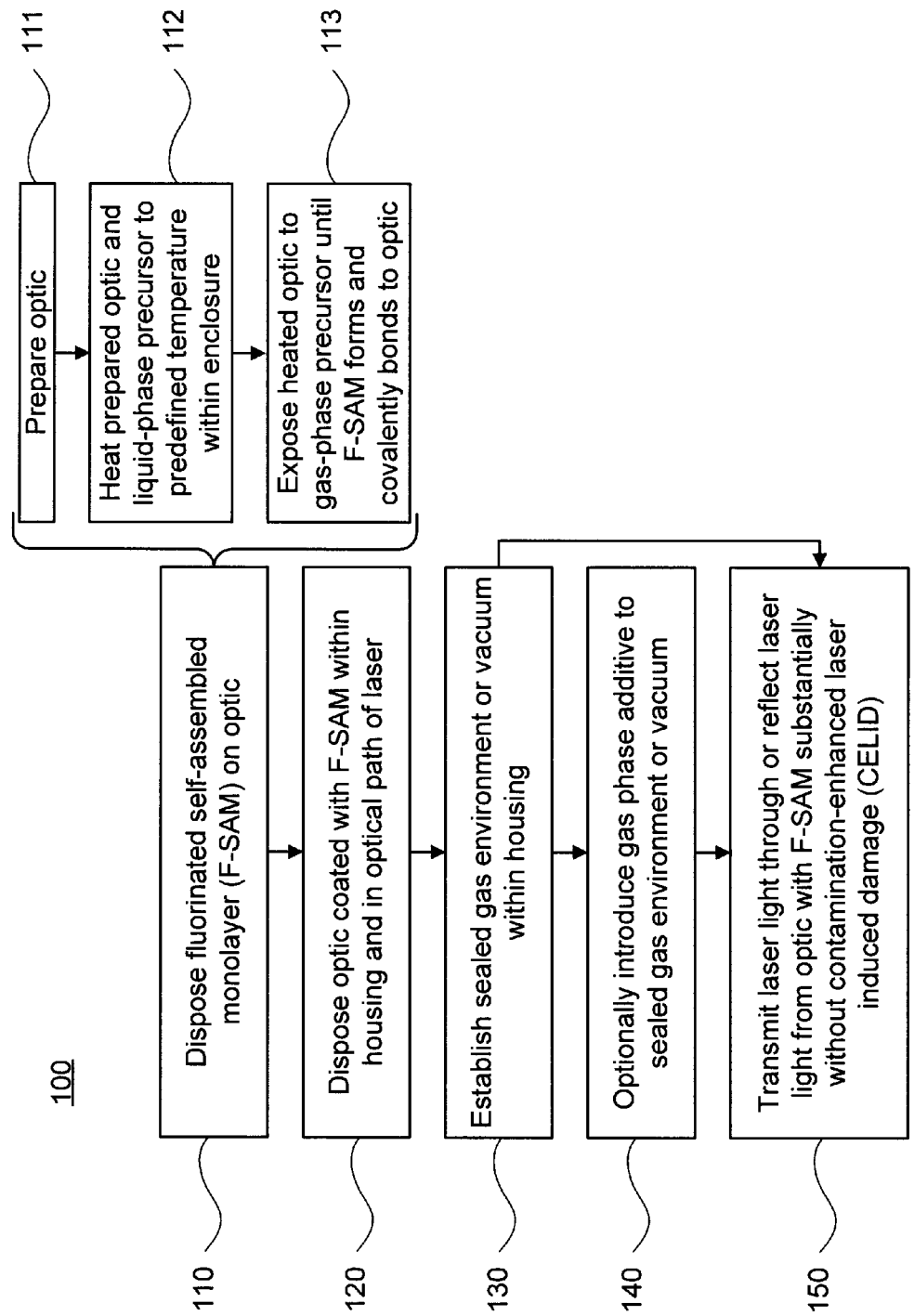
FIG. 1 illustrates steps in an exemplary method for reducing contamination enhanced laser induced damage (CELID) to an optic using a fluorinated self-assembled monolayer (F-SAM), according to some embodiments of the present invention.

Turning first to FIG. 1, method 100 illustrates a plurality of steps for inhibiting CELID to an optic, according to some embodiments of the present invention. Method 100 includes disposing a fluorinated self-assembled monolayer (F-SAM) on an optic (step 110). As is familiar to those skilled in the art, self-assembled monolayers (SAMs) are organized assemblies of molecules disposed at an interface between two phases of matter, e.g., between a gas phase and a liquid phase, or between a gas phase and a solid phase, or between a liquid phase and a solid phase. SAMs typically include a "head group" that is oriented towards the interface, and a "tail group" that is oriented away from the interface. In embodiments of the present invention, the F-SAM includes a head group that is oriented towards, and covalently bound to, the interface between the solid phase optic and the optic's gas phase surroundings, which may include a sealed gas environment or a vacuum defined by a housing in which the optic is disposed. The F-SAM also includes a tail group that includes a fully or partially fluorinated hydrocarbon chain that is oriented away from the interface.

Figure 2A:
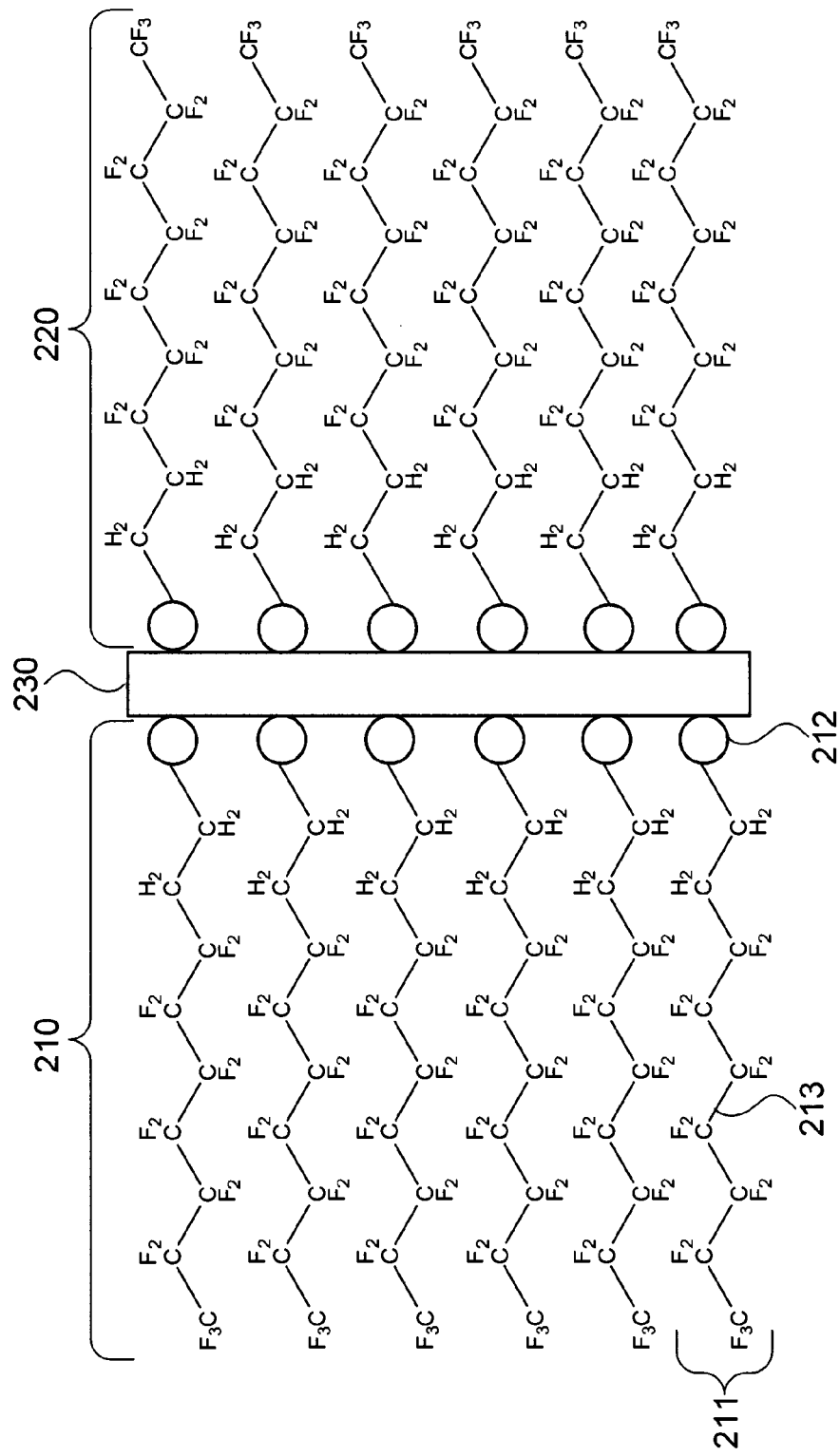
FIGS. 2A-2B schematically illustrate optics that may be coated with an F-SAM using the method of FIG. 1, according to some embodiment of the present invention.

For example, FIG. 2A schematically illustrates first and second F-SAMs 210, 220 that are covalently bound to respective sides of a transmissive optic 230. Optic 230 may be formed of any suitable material that is substantially transparent to the wavelength(s) of laser light to be transmitted therethrough. Note that because optic 230 is transmissive and thus has first and second surfaces through which laser light may pass, it may be desirable to dispose F-SAMs 210, 220 respectively on both of such surfaces so as to inhibit CELID to both of the surfaces. However, for reflective optics having only a single surface that interacts with a laser beam, it may not be necessary to dispose an F-SAM on a surface of the optic other than that single surface.

F-SAMs 210, 220 respectively include a plurality of molecules 211, each of which includes head group 212 that is covalently bound to optic 230, and tail group 213 that is covalently bound to the head group and extends away from optic 230. Head group 212 may be any suitable chemical moiety that covalently bonds to the material from which optic 230 is formed without significantly altering the transmission properties of optic 230. Exemplary moieties suitable for use as head group 212 include siloxanes (Z—Si—O— linkages to optic 230, where Z is a generic designation for tail group 213), thiolates (Z—S— linkages to optic 230), or phosphonates (Z—PO(OH)—O— or Z—PO(OY)—O— linkages to optic 230, where Y is alkyl or aryl), although other moieties suitably may be used. Head groups 212 based on siloxanes may be particularly preferred for use with optics formed of or coated with silica ($SiO_2$) or another suitable oxide, because siloxanes may have similar optical properties to silica, are readily available, may form an irreversible bond with silica, and their chemistry is well-understood. However, because the monolayer of head groups 212 is relatively thin, it is believed that many moieties are unlikely to significantly alter the transmission properties of optic 230.

Tail group 213 of molecules 211 may be any suitable chemical moiety that covalently bonds to head group 212, and that has both hydrophobic and oleophobic properties when self-assembled into a monolayer such as F-SAMs 210, 220. Preferably, tail group 213 includes a fully or partially fluorinated hydrocarbon chain, which in some embodiments may have the chemical structure of Formula I:

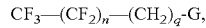

$CF_3$—$(CF_2)_n$—$(CH_2)_q$-G, where n is zero or an integer, q is zero or an integer, and G is a generic designation for head group 212. The particular tail group 213 illustrated in FIG. 2A, in which n is six and q is two, is intended to be purely illustrative. For example, n may be between zero and twenty, q may be between zero and twenty, and n+q may be twenty or less. For example, n may be between five and ten, and q may be between two and four. In one particularly preferred embodiment, n is seven, and q is two. It should be understood that tail group 213 suitably may have a structure other than that of Formula I, e.g., may include other chemical moieties, including heteroatoms, functional groups, and the like. However, it is believed that fully or partially fluorinated hydrocarbon chains of Formula I may be particularly well suited to form F-SAMs that inhibit CELID.

Optic 230, head group 212, and tail group 213 are co-selected so as to facilitate self-assembly of molecules 211 into relatively highly organized F-SAMs 210, 220 that extend substantially contiguously across the respective surfaces of optic 230. For example, in the embodiment illustrated in FIG. 2A, molecules 211 are relatively evenly distributed across the surfaces of optic 230, have substantially the same orientation as one another, and packed relatively closely with one another. For example, in the embodiment illustrated in FIG.

2A, head groups 212 are positioned relatively close to one another, which causes tail groups 213 to pack in a relatively organized fashion with one another, e.g., so as to form a semicrystalline or crystalline three-dimensional structure over the surface of optic 230. In particular, tail groups 213 may have substantially the same angle as one another relative to the surface of optic 230, e.g., an angle of greater than about thirty degrees, or greater than about sixty degrees, or greater than about seventy degrees, or greater than about eighty degrees, relative to the surface of optic 230. Note that at the maximum packing density of molecules 211 on optic 230, tail groups 213 may have an angle of about ninety degrees relative to the surface of optic 230, and may be considered to form a crystalline three-dimensional structure. As used herein, the terms "about" or "approximately" mean within plus or minus ten percent of the stated value.

The chemical properties of optic 230, head group 212, and tail group 213 may influence the density and relative angle at which molecules 211 are packed on the surface of the optic, as well as the hydrophobic and hydrophilic properties of the resultant F-SAMS 210, 220. For example, as noted above, head group 212 preferably covalently bonds to optic 230, e.g., via a siloxane bond. However, it may be desirable for head group 212 to have at least some mobility on the surface of optic 230 before formation of the covalent bond, so as to facilitate self-assembly of molecules 211 into a relatively ordered structure. Optionally, molecules 211 are also bound to one another, thus further enhancing the stability of F-SAMs 210, 220. For example, as described further below with reference to FIG. 2C, the optic may include silica ($SiO_2$) or other suitable oxide, and the head group of the F-SAM may include a siloxane group that covalently bonds both to the optic and to other head groups of the F-SAM.

It also may be desirable for tail group 213 to have a sufficient number of fluorinated carbons as to impart a sufficient degree of hydrophobicity and oleophobicity to the finished F-SAM to inhibit CELID. That is, for tail groups having the chemical structure of Formula I, n preferably is sufficiently great, e.g., n preferably is greater than three, or greater than five, or greater than seven, or greater than nine. At the same time, the overall length of tail group 213 preferably is sufficiently short so as to inhibit "tangling" or crossing of the tail groups with one another, which may inhibit relatively close, ordered packing of molecules 211 with one another. That is, n+q preferably is twenty five or less, or twenty three or less, or twenty one or less, or nineteen or less, or seventeen or less, or fifteen or less, or thirteen or less, or eleven or less, or nine or less, or seven or less, or five or less.

Figure 3A:
FIG. 3A is an optical image of a water droplet disposed on a bare fused silica ($SiO_2$) optic.
Figure 3B:
FIG. 3B is an optical image of a toluene droplet disposed on a bare fused silica optic.

As is familiar to those skilled in the art, a surface's amount of hydrophobicity or oleophobicity respectively may be characterized by measuring the contact angle formed between the surface and a droplet of water or an organic solvent disposed thereon; the greater the contact angle, the more "phobic" the surface is to the fluid of the droplet. FIGS. 3A-3D are photographs of water and toluene droplets disposed on a fused silica optic that is either bare (FIGS. 3A-3B) or that is coated (FIGS. 3C-3D) with an F-SAM of molecules having the general structure of Formula I, in which n is seven and q is two, and the head group is a siloxane group. Specifically, FIG. 3A is a photograph of a water droplet disposed on a bare fused silica ($SiO_2$) optic that was cleaned using a piranha solution, e.g., a 3:1 mixture of sulfuric acid ($H_2SO_4$) and hydrogen peroxide ($H_2O_2$), that both removes most organic matter from the optic and hydroxylates the optic's surface. It may be seen that the contact angle between the water droplet and the optic is relatively low, and was measured to be approximately 4.30 degrees. FIG. 3B is a photograph of a toluene droplet disposed on a bare fused silica optic that similarly was cleaned using a piranha solution. It may be seen that the contact angle between the toluene droplet and the optic is relatively low, and was measured to be approximately 5.09 degrees. Contact angles of less than ten degrees may be considered to represent a particularly strong, "philic" interaction between a fluid and a surface. As such, the piranha-cleaned bare fused silica optic may be considered to be both hydrophilic and oleophilic.

Figure 3D:
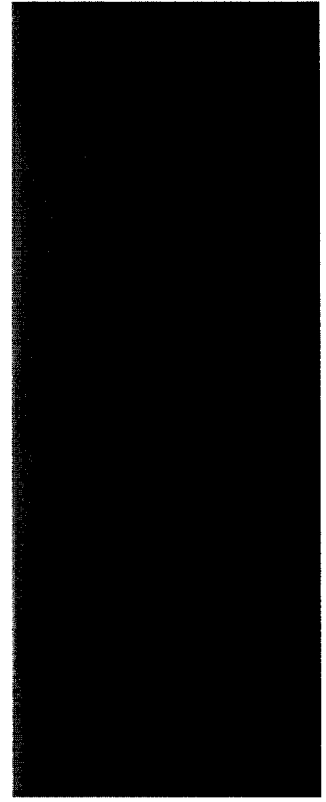
FIG. 3D is an optical image of a toluene droplet disposed on a fused silica optic coated with an exemplary F-SAM.
Figure 3C:
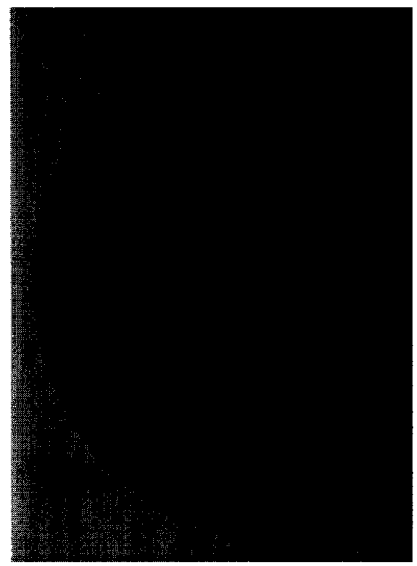
FIG. 3C is an optical image of a water droplet disposed on a fused silica optic coated with an exemplary F-SAM.

In comparison, FIG. 3C is a photograph of a water droplet disposed on an analogous fused silica optic that is coated with an F-SAM of molecules having the general structure of Formula I, in which n is seven and q is two, and the head group is a siloxane group. It may be seen that the contact angle between the water droplet and the optic is relatively large, and was measured to be approximately 107.27 degrees. FIG. 3D is a photograph of a toluene droplet disposed on an F-SAM coated optic analogous to that in FIG. 3C. It may be seen that the contact angle between the toluene droplet and the optic is relatively large, and was measured to be approximately 61.16 degrees. Contact angles of greater than fifty degrees may be considered to represent a "phobic" interaction between a fluid and a surface, while contact angles of greater than 100 degrees maybe considered to represent a "strongly phobic" interaction between the fluid and the surface. As such, it may be seen that the F-SAM coated optic is both oleophobic and strongly hydrophobic, meaning that the F-SAM is particularly well suited for inhibiting CELID. Indeed, as described further below in the "Examples" section, it was observed that an F-SAM coated optic analogous to that in FIGS. 3C-3D was particularly well suited for inhibiting CELID.

Figure 4:
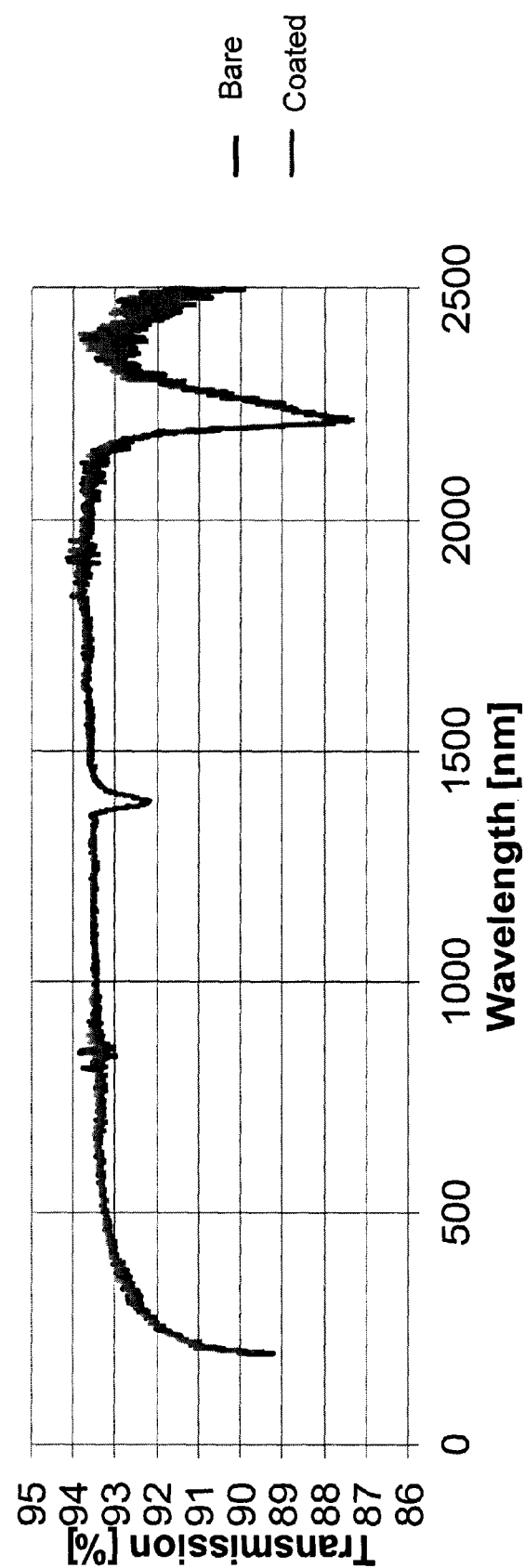
FIG. 4 illustrates the measured UV-Vis spectra of a bare fused silica optic and a fused silica optic coated with an exemplary F-SAM.

It is also desirable that optic 230 together with F-SAMs 210, 220 are substantially transparent to wavelength(s) of light to be transmitted therethrough. FIG. 4 illustrates the measured UV-Vis spectra of a bare fused silica optic analogous to that in FIGS. 3A-3B, and of an F-SAM coated optic analogous to that in FIGS. 3C-3D. It may be seen in FIG. 4 that both of the optics are highly transmissive within the spectral range of about 300 to 2200 nm, and that any differences in the spectra of the two optics are relatively small. Thus, it is believed that the F-SAM does not significantly alter the transmission characteristics of the optic within wavelength ranges in which the optic may be used.

Figure 2B:
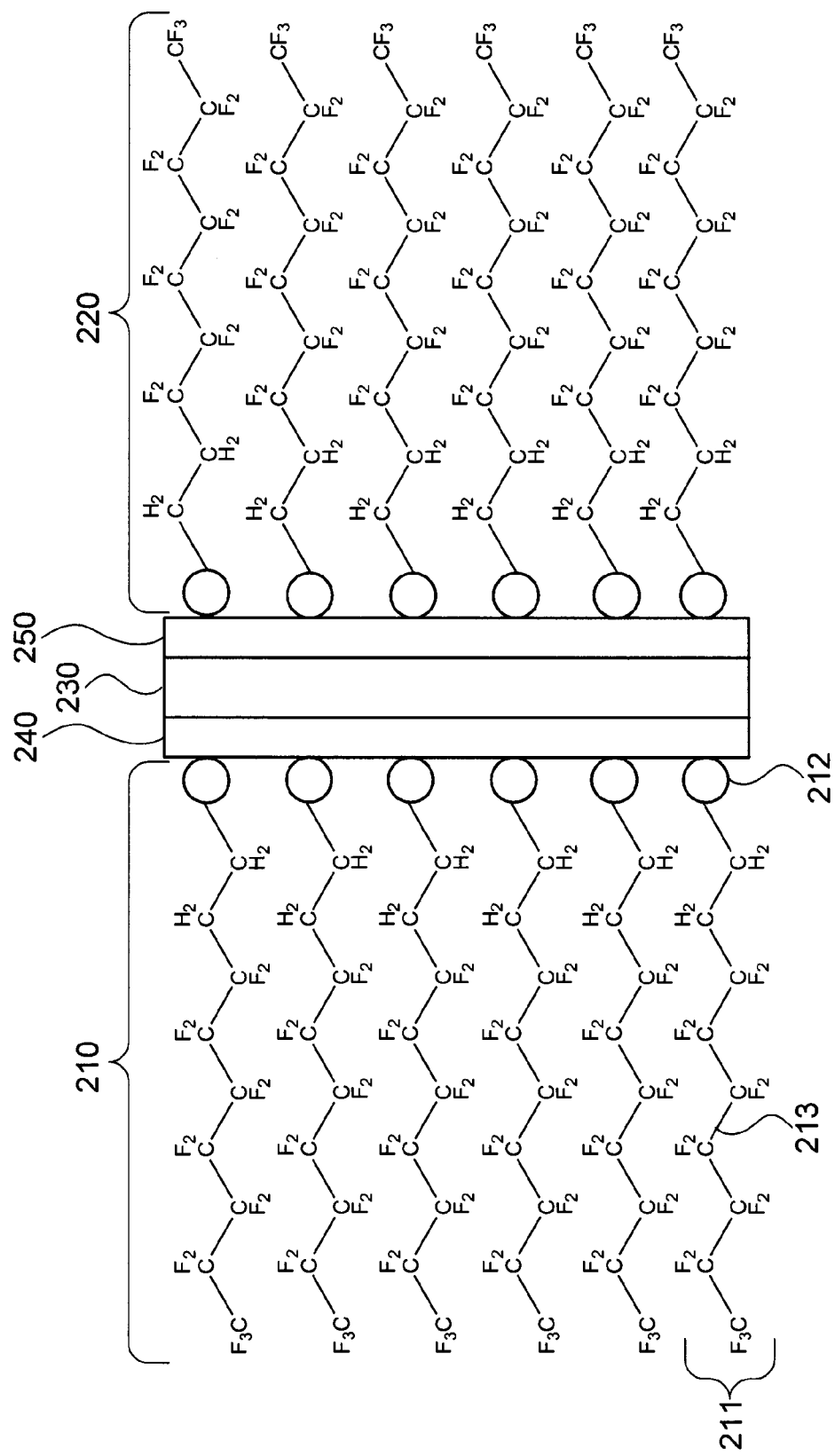

Turning back to FIG. 1, F-SAMs such as described above may be prepared using any suitable method. For example, the optic first may be prepared, e.g., so as to facilitate covalent bonding of the F-SAM to the optic (step 111). Such preparation may include suitably cleaning the optic, or depositing on the optic a coating to which the F-SAM may covalently bond. Exemplary cleaning methods may include exposing the optic to an oxygen plasma or immersing the optic into an appropriate cleaning solution, such as a piranha solution. Or, for example, FIG. 2B schematically illustrates an optic upon which optional coatings 240, 250 have been deposited, and to which F-SAMs 210, 220 are covalently bonded. Such an embodiment is particularly useful if the material from which the optic is formed may not react directly with head group 212 of molecules 211. For example, coatings 240, 250 may include silica or other suitable oxide, and thus facilitate covalent bonding of siloxane-based F-SAMs to optic 230 without requiring that optic 230 itself be formed of silica or other suitable oxide. Coatings 240, 250 may have additional functionalities that may improve the performance of optic 230, e.g., may be anti-reflective or anti-scratch coatings. Additionally, for embodiments in which optic 230 or optional coatings 240, 250 are formed of silica or other suitable oxide and the F-SAM contains a siloxane group, it may be useful to clean the optic or coatings 240, 250 with a piranha solution so as to remove organic contaminants and to hydroxylate the surface immediately before forming the F-SAM.

As illustrated in FIG. 1, the prepared optic and a liquid-phase precursor then may be heated to a predefined temperature within an enclosure (step 112). When so heated, the liquid-phase precursor may partially vaporize within the enclosure to form a gas-phase precursor having a partial pressure that is based on the predefined temperature. The prepared optic then is exposed to the gas-phase precursor until an F-SAM forms and covalently bonds to the optic (step 113). Specifically, the liquid-phase precursor may include tail group 213 analogous to that described above with reference to FIG. 2A, and may include a precursor head group that has a chemical affinity for optic 230. Heating the liquid-phase precursor to substantially the same temperature as optic 230 within an enclosure yields a gas-phase precursor that also has substantially the same temperature as the optic, and is at the same pressure as the optic. Because there is substantially no temperature or pressure differential between the gas-phase precursor and the optic, then the precursor head group's chemical affinity for the optic may drive the precursor to condense onto the optic in a relatively controlled manner. For example, upon condensing at the optic, the precursor head group may be oriented toward the optic, while the tail group may be oriented away from the optic. The precursor head group then reacts with optic 230 to form a head group 212 analogous to that described above with reference to FIG. 2A. However, the predefined temperature is sufficiently low that the precursor head group may be mobile on the optic surface for some time before covalently reacting with the optic, thus permitting the condensed precursor to self-assemble into an ordered structure before being fixed in place by such a reaction.

The tail group of the liquid-phase or gas-phase precursor may have substantially the same structure as described above with reference to FIG. 2A. For example, the tail group may include a fully or partially fluorinated hydrocarbon chain, which in some embodiments may have the chemical structure of Formula I:

$$CF_3—(CF_2)_n—(CH_2)_q\text{-}G',$$

where n is zero or an integer, q is zero or an integer, and G' is a generic designation for the precursor head group. Exemplary values for n and q are provided elsewhere herein. Exemplary precursor head groups G' include silanes (Z—Si—OH, where Z is a generic designation for the tail group), which may react with an oxide-based optic to form a siloxane; thiols (Z—SH), which may react with a noble metal-based optic to form a thiolate; or phosphonic acids (Z—PO(OH)—OH or Z—PO(OY)—OH, where Y is alkyl or aryl), which may react with a metal-based optic to form a phosphonate. Other precursor head groups suitably may be used.

In one particularly preferred embodiment, the liquid-phase precursor has the general structure of Formula II:

$$CF_3—(CF_2)_n—(CH_2)_q—SiX_pY_{3\text{-}p},$$

where n is zero or an integer, q is zero or an integer, X is an alkoxy group, Y is a halogen, and p is zero or an integer between one and three. For example, n may be between zero and twenty, q may be between zero and twenty, and n+q may be twenty or less. In one illustrative embodiment, n is between five and ten, q is between two and four, Y is Cl, and p is zero.

Figure 2C:
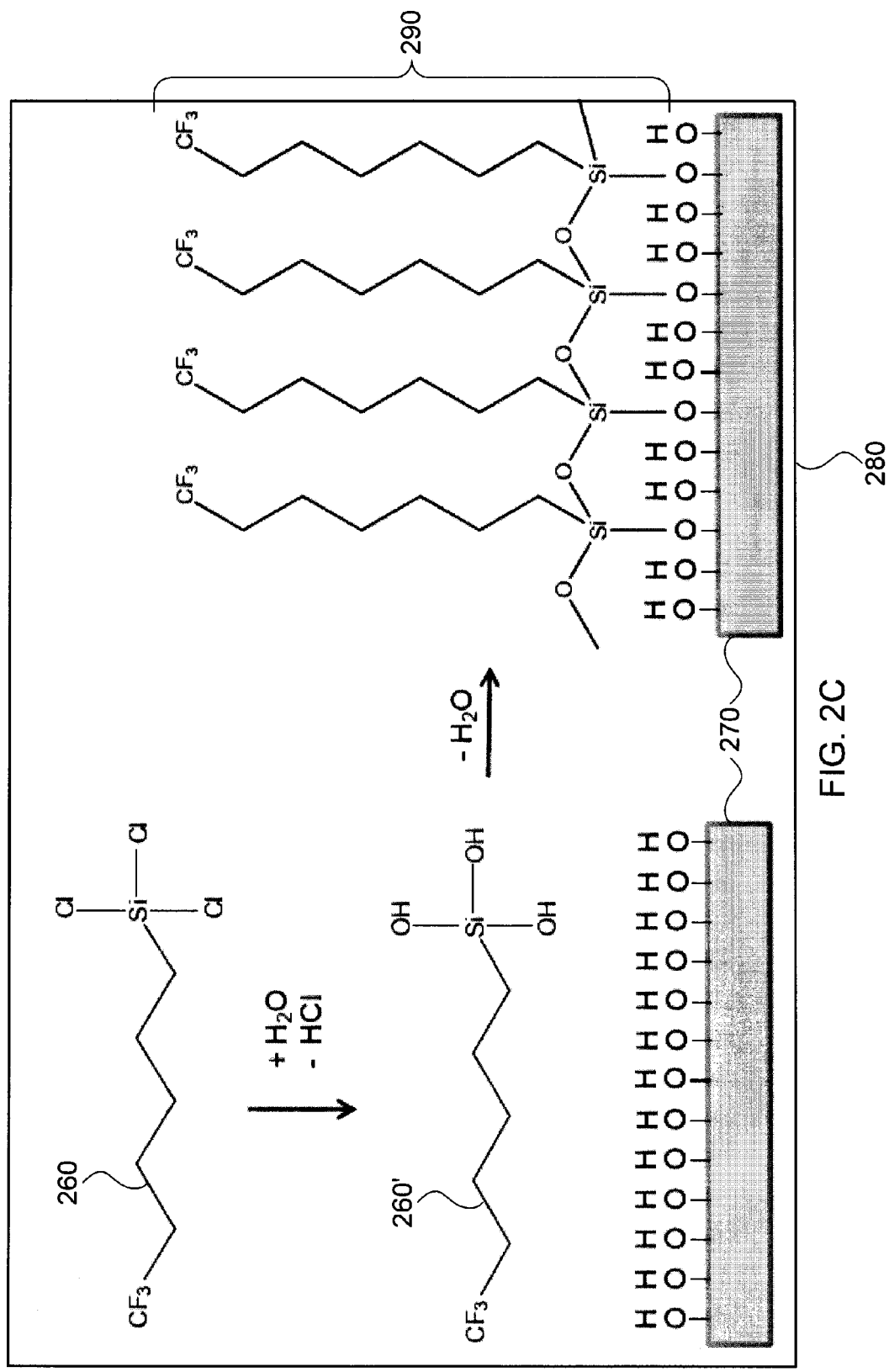
FIG. 2C schematically illustrates exemplary structures that may be formed using one particular embodiment of the method of FIG. 1.

FIG. 2C illustrates structures that may be formed during one illustrative implementation of steps 111-113 illustrated in FIG. 1. Precursor molecule 260 has the structure of Formula II, in which n is zero, q is five, Y is Cl, and p is zero, such that the precursor head group is a trichlorosilane (SiCl$_3$). Optic 270 is formed of an oxide such as silica or is coated with an oxide such as silica, and has been cleaned using a piranha solution such that its outer surface is substantially covered with hydroxyl (OH) groups. Optic 270 and a small open jar containing an excess of precursor molecule 260 are enclosed within housing 280 and heated to substantially the same temperature as one another in a moist (water-containing) atmosphere. As illustrated in FIG. 2C, the precursor molecule vaporizes into the gas phase, and water in the atmosphere hydrolyzes the trichlorosilane bonds, yielding modified precursor molecule 260' having a trisilanol precursor head group (Si(OH)$_3$). Gas-phase modified precursor molecule 260' then coalesces at, and covalently reacts with, the hydroxyl groups on the surface of optic 270, thus forming F-SAM 290. Note that the resulting siloxane head groups are bonded not only to oxygen atoms at the surface of optic 270, but also to one another via —Si—O—Si—O— linkages, thus enhancing the strength and organizational structure of F-SAM 290.

It should be apparent that step 110 of FIG. 1 may be implemented in any suitable manner, and that any suitable F-SAM may be prepared thereby. For example, although F-SAMs 210, 220 illustrated in FIG. 2A are formed using the same type of molecules 211 as one another, it should be apparent that each F-SAM may include different types of molecules than one another, and indeed may itself be formed of different types of molecules.

Figure 5A:
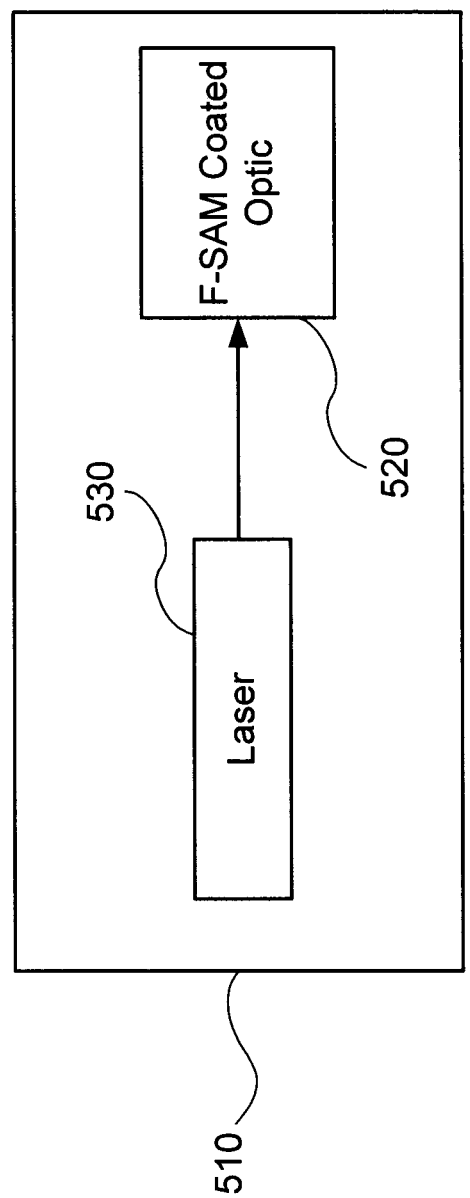
FIG. 5A schematically illustrates a system for inhibiting CELID to an optic, according to some embodiments of the present invention.

Continuing with method 100 illustrated in FIG. 1, the optic coated with the F-SAM may be disposed within a housing, and in the optical path of a laser (step 120), and a sealed gas environment or vacuum may be established within the housing (step 130). For example, as illustrated in FIG. 5A, system 500 may include housing 510, F-SAM coated optic 520, and laser 530, with the F-SAM coated optic disposed in the optical path of the laser. Housing 510 may be any structure suitable for containing optics, and in some embodiments is configured for space flight. The housing may be sealed using suitable techniques known in the art to create a sealed gas environment. For example, the housing may be in a vacuum because the housing is in space. Or, for example, a vacuum may be achieved within the housing suitable techniques known in the art, e.g., using a turbomolecular pump or rough pump. As discussed above, optics may be vulnerable to CELID in such environments. However, providing an F-SAM coating on optic 520 is believed to inhibit CELID, thus enhancing the stability over time of system 500. Laser 530 may be any laser suitable for use in housing 510, e.g., a Nd:YAG laser, or a Ti:Sapphire laser. Although illustrated in FIG. 5A as being a separate component, optic 520 may in some embodiments be part of laser 530. Additionally, laser 530 instead may be disposed outside housing 510, and the housing may include a window allowing the laser beam to travel into the housing and to impinge upon F-SAM coated optic 520. Housing 510 also may have an exit window, allowing the laser beam to travel through or reflect from optic 520 and through the window to exit housing 510.

Optionally, method 100 illustrated in FIG. 1 further includes introducing a gas phase additive to the sealed gas environment or vacuum (step 140). For example, as described in greater detail in U.S. Patent Publication No. 2011/0236569, filed Mar. 29, 2010 and entitled "Systems and Methods for Preventing or Reducing Contamination Enhanced Laser Induced Damage (C-LID) to Optical Components Using Gas Phase Additives," the entire contents of which are incorporated by reference herein, certain gas phase additives such as water or alcohols (e.g., methanol or ethanol) have been found to be useful in reducing CELID within an enclosed gas environment or vacuum. It is believed that introducing such a gas phase additive to an environment that contains the present F-SAM coated optic may further inhibit CELID.

Figure 5B:
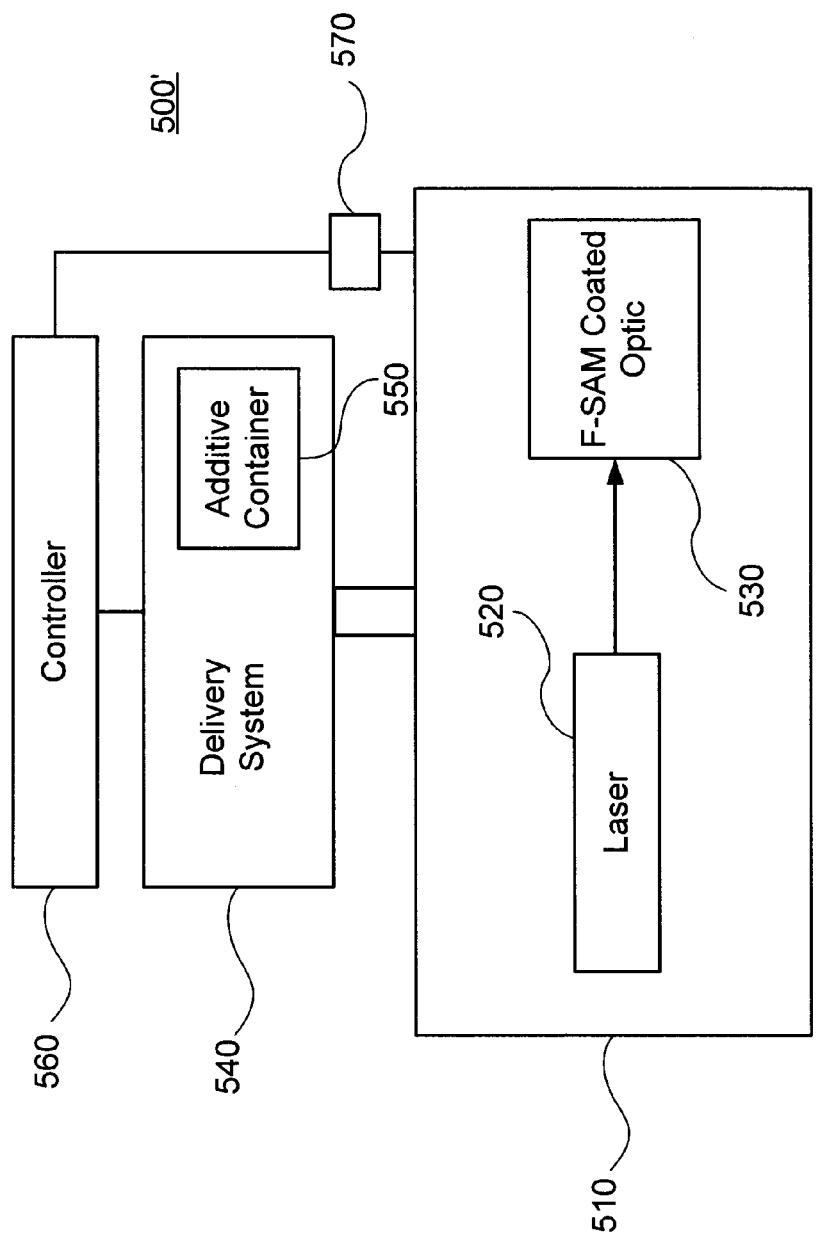
FIG. 5B schematically illustrates an alternative system for inhibiting CELID to an optic, according to some embodiments of the present invention.

For example, modified system 500' illustrated in FIG. 5B may include housing 510, laser 520, and F-SAM coated optic 530 analogous to those described above with reference to FIG. 5A. Additionally, system 500' may include delivery system 540 that includes additive container 550 configured to hold a gas phase additive, controller 560, and sensor 570. Delivery system 540 is suitably coupled to housing 510 and to controller 560, and may introduce the gas phase additive to housing 510 under the control of controller 560. Specifically, sensor 570 may monitor the concentration of the gas phase additive within housing 510, and provide a corresponding output to controller 560. Responsive to such output, controller 560 may instruct delivery system 540 to deliver an appropriate amount of the gas phase additive from additive container 550. Additive container 550 may be any structure configured to hold the gas phase additive, whether in gas, liquid, or solid form. Non-limiting examples of additive container 550 include a pressurized bottle, a bubbler, an aerosol bottle, or a device for holding a sorbent. The gas phase additive may be any substance that has a greater affinity for the optic than does one or more contaminants that may induce CELID. Non-limiting examples of the gas phase additive include water and alcohols such as methanol and ethanol. Alcohols such as methanol or ethanol are useful for space-based lasers because they have low freezing points as compared to water.

Other arrangements of elements for optionally delivering a gas phase additive into housing 510 suitably may be used. For further details on systems and methods for using gas phase additives to inhibit CELID, please see U.S. Patent Publication No. 2011/0133863.

Referring again to FIG. 1, following optional step 140 (or if optional step 140 is omitted), laser light is then transmitted through or reflected from the optic coated with the F-SAM, substantially without CELID (step 150). For example, as described in greater detail below in the "Examples" section, it is believed that the present F-SAM coatings may render optics suitable for prolonged use in environments in which bare optics rapidly may be damaged. For example, the present F-SAM coatings may allow an optic suitably to be used for 100,000 or more laser shots, or for 1,000,000 or more laser shots, or 10,000,000 or more laser shots without CELID in an environment in which a bare optic may be damaged beyond the point of usability in about 50,000 laser shots or fewer, e.g., fewer than 20,000 laser shots, or fewer than 10,000 laser shots.

EXAMPLES

The functionality of method 100, optic 230 having one or more F-SAM coatings 210, 220, and system 500 for inhibiting CELID may be illustrated by way of example as described below.

1. Experimental Set-Up

Figure 6:
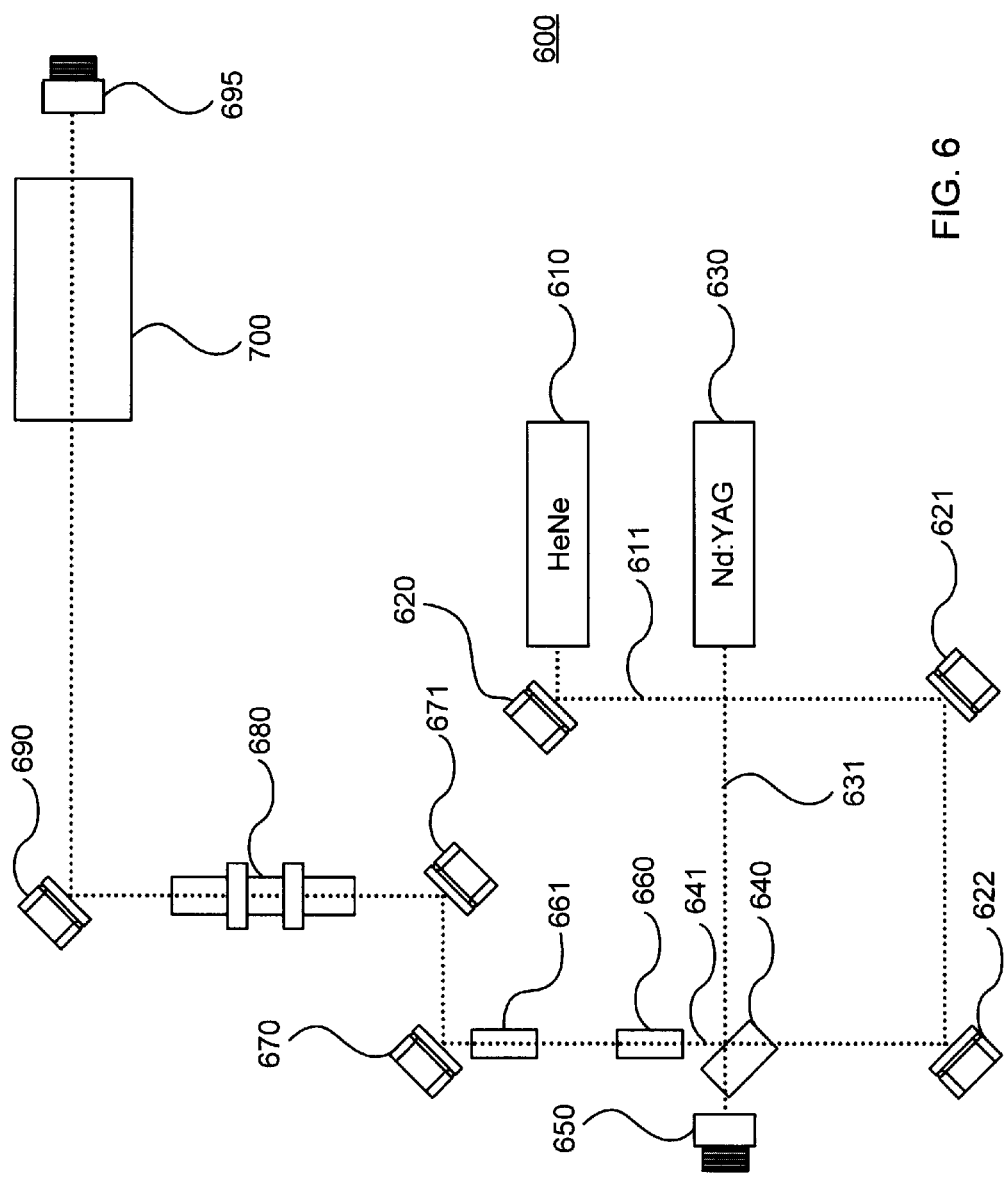
FIG. 6 schematically illustrates a high-level view of a CELID test apparatus.

FIG. 6 is a schematic view of CELID test apparatus 600, which may be used to measure Laser Induced Damage Threshold (LIDT) and the extent of CELID on bare fused silica optics in vacuum conditions. Apparatus 600 includes helium neon (HeNe) laser 610, which generates HeNe laser beam 611; mirrors 620, 621, 622; Nd:YAG laser 630, which generates Nd:YAG laser beam 631; dichroic beam splitter 640; energy meters 650, 695; irises 660, 661; high-power laser mirrors 670, 671, 690; telescope 680; and test chamber 700 which, as described in greater detail below, contains an F-SAM coated fused silica optic, or alternatively a bare fused silica optic for comparative purposes.

The laser beams in apparatus 600 were aligned before entering test chamber 700. HeNe laser 610 emits HeNe laser beam 611. Mirrors 620, 621, 622 reflect HeNe laser beam 611 to an appropriate point on dichroic beam splitter 640. Nd:YAG laser 630 emits Nd:YAG laser beam 631. Nd:YAG laser 630 is a flash-lamp pumped, 1064 nm pulsed Nd:YAG laser (e.g., Continuum Powerlite II), having a repetition rate of 20 Hz, and a nominal diameter of 10 mm, as determined from burn paper. Nd:YAG laser beam 631 travels to dichroic beam splitter 640 where dichroic beam splitter 640 splits Nd:YAG laser beam 631 into two parts. One part of Nd:YAG laser beam 631 travels to energy meter 650, which measures the transmitted laser energy from Nd:YAG laser beam 631. The second part of Nd:YAG laser beam 631 meets with HeNe laser beam 611 at dichroic beam splitter 640 so that the two beams 611, 631 travel collinearly through the remainder of the system, allowing HeNe laser beam 611 to be used to align Nd:YAG laser beam 631 (illustrated as combined beam 641). Beam 641 travels to irises 660, 661 which are used to align beam 641. High-power laser mirrors 670, 671 appropriately direct beam 641 through telescope 680 (e.g., a Galilean telescope). Telescope 680 is used to collimate beam 641, resulting in a reduction in beam diameter that decreases laser power loss from light scattering. High-power laser mirror 690 directs beam 641 through test chamber 700.

When beam 641 is properly aligned, it enters test chamber 700 and passes through the F-SAM coated or bare fused silica optic. Energy meter 695 measures the laser energy transmitted through chamber 700 and the optic being tested.

Figure 7:
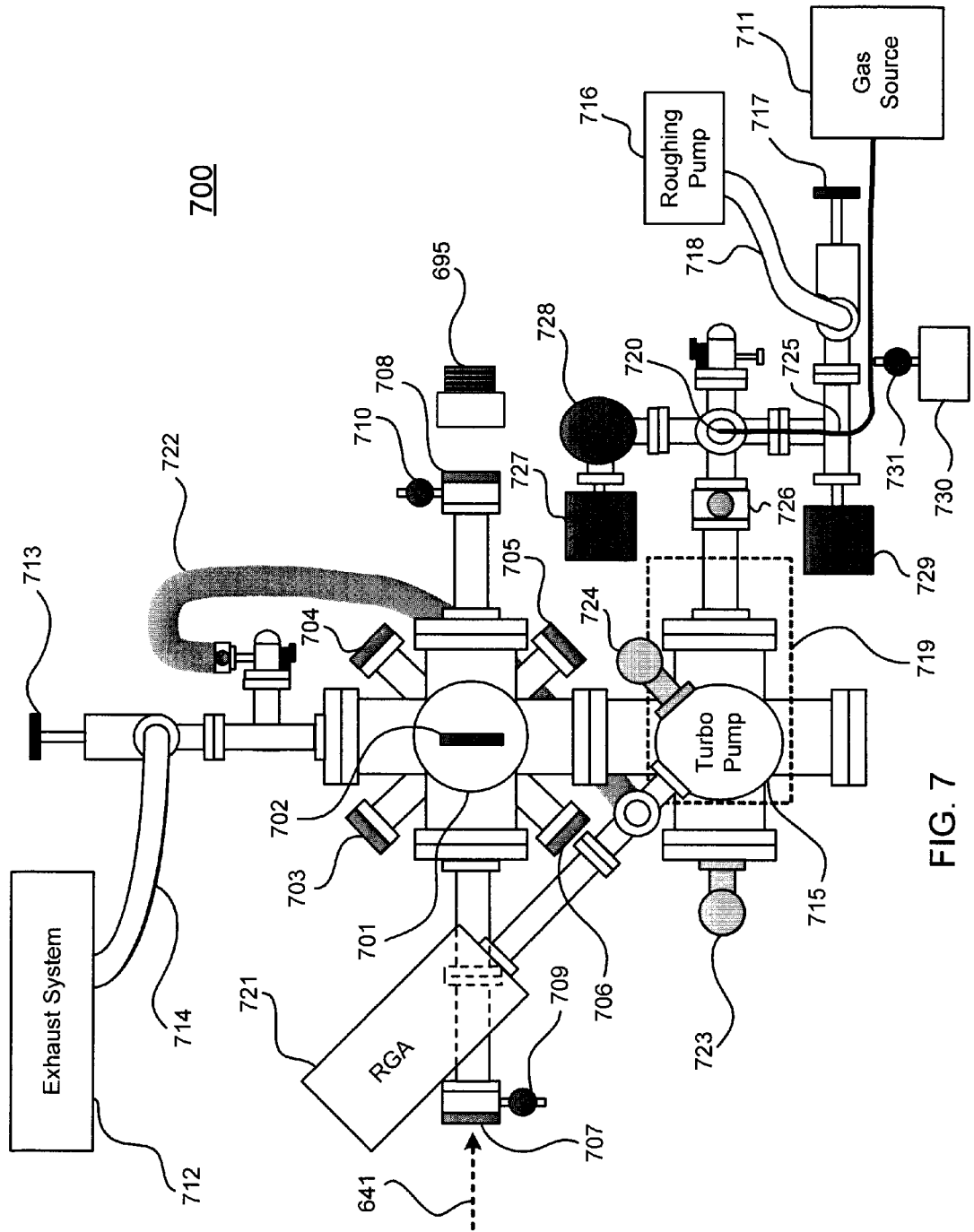
FIG. 7 schematically illustrates a plan view of a CELID test chamber for use with the apparatus of FIG. 6.

FIG. 7 schematically illustrates a plan view of an exemplary CELID test chamber 700 suitable for use with apparatus 600 illustrated in FIG. 6. Chamber 700 is used to expose optic 702 (e.g., an F-SAM coated or bare fused silica optic) to a laser beam in vacuum conditions and to introduce gas phase additives. Chamber 700 includes exposure chamber 701 having optic 702 disposed therein, gas source 711, exhaust system 712, turbomolecular pump 715, roughing pump 716, contaminant bubbler 730, and various view ports, valves, and pieces of measuring equipment, some of which are described in greater detail below and the remainder of which will be familiar to those of ordinary skill in the art of vacuum chambers.

The optic 702 to be tested, e.g., an F-SAM coated or bare fused silica optic, was positioned within exposure chamber 701 so as to allow the optic to be exposed to the laser beam 641. Exposure chamber 701 is stainless steel and consists of a 6" cross. Optic 702 includes a 2" diameter fused bare fused silica window that was cleaned in a piranha solution consisting of sulfuric acid ($H_2SO_4$) and hydrogen peroxide ($H_2O_2$), and was either left bare for comparison, or was coated with an F-SAM based on the following precursor molecule:

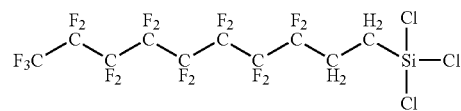

The molecule, 1H,1H,2H,2H-perfluorodecyltricholorosilane, may be referred to as "FDTS" and has been assigned CAS No. 78560-44-8. The F-SAM was prepared using the method of FIG. 1 and the general scheme described above with reference to FIG. 2C. Specifically, the cleaned optic and a jar of FDTS were placed in an oven and heated to approximately 110 degrees Celsius for approximately 120 minutes. After the optic was cooled, it was removed from the oven and characterized for contact angle with water and toluene as described above with reference to FIGS. 3C-3D, and for laser-induced damage threshold as described below with reference to FIGS. 12A-12B.

Exposure chamber 701 contains a fixture (not shown) for holding and translating optic 702 so as to allow automated positioning and testing. View ports 703, 707, 705, 706, 707, 708, e.g., silica windows, are coupled to the exposure chamber 701 via stainless steel tubes with adapter flanges, and are used to visually align optic 702 within exposure chamber 701. Entrance view port 707 allows beam 641 to travel into test chamber 700 and through optic 702, while exit view port 708 allows beam 641 to exit test chamber 700 and travel to energy meter 695 following transmission through optic 702.

To reduce the risk of damage to entrance view port 707 and/or exit view port 708 by beam 641 during the experiment, purge valves 709, 710 are coupled to entrance view port 707 and exit view port 708, respectively. Purge valves 709, 710 may be opened to purge their respective view port 707, 708 with atmospheric gas from gas source 711 via gas lines (not shown), to inhibit contamination buildup. As a result, the transmitted laser energy of beam 641 was believed to be unaffected by damage to entrance view port 707 or exit view port 708.

Test chamber 700 includes exhaust system 712 coupled to exhaust valve 713 via vacuum line 714. Exhaust system 712 is maintained near atmospheric pressure, allowing any introduced gas to continuously flow through the chamber and exit via exhaust system 712. Exhaust valve 713 can be closed to achieve vacuum conditions within test chamber 700.

Vacuum conditions are achieved using turbomolecular pump 715 and roughing pump 716 to simulate a space-based laser operated in its flight enclosure, thus allowing CELID to be observed. Turbomolecular pump 715 is coupled to exposure chamber 701 via a stainless steel tube with an adapter flange, while roughing pump 716 is coupled to roughing valve 717 via vacuum line 718. Gate valve 719 is used to isolate turbomolecular pump 715 from test chamber 700 while the lasers are activated during the experiments. Both pumps remain on for the full duration of an experiment.

The process for achieving vacuum conditions within test chamber 700 begins by closing purge valves 709, 710, closing exhaust valve 713, and shutting off a gas valve (not shown) at gas inlet 720. Roughing valve 717 is opened, allowing roughing pump 716 to reduce the pressure within exposure chamber to approximately 100 mTorr. Roughing valve 717 is closed and gate valve 719 is opened, allowing turbomolecular pump 715 to reduce the pressure in the chamber to the microTorr region, thereby achieving vacuum conditions. Gate valve 719 is then closed.

Test chamber 700 includes several pieces of measuring equipment used to monitor the vacuum conditions. Residual gas analyzer (RGA) 721 is coupled to turbomolecular pump 715 via a stainless steel tube with an adapter flange, and monitors the quality of the vacuum and detects minute traces of impurities. RGA 721 is coupled to the turbo-pumped portion of the chamber, and operates between $1\times10^{-8}$ Torr and $1\times10^{-4}$ Torr. Vacuum line 722 is connected between RGA 721 and exhaust valve 713, allowing gases to travel to RGA 721 for measurement after going through exposure chamber 701, while gate valve 719 is closed. Ion gauges 723, 724 are coupled to turbomolecular pump 715, and measure the pressure within test chamber 700 at their respective locations.

After vacuum conditions are achieved, the chamber is filled with gas to create a controlled flowing gas environment. This is accomplished by backfilling test chamber 700 with a gas, e.g., nitrogen and/or oxygen, from gas source 711 via gas line 725, and opening the gas valve, purge valves 709, 710, exhaust valve 713, and butterfly valve 726. Gas from gas source 711 flows into the chamber via the gas valve and purge valves 709, 710, travels through the chamber, and exits through exhaust system 712. There are several pieces of equipment that can be used to monitor the flowing gas environment, including capacitance manometers 727, 728, 729, which measure pressure. Each manometer 727, 728, 729 is respectively calibrated to accurately measure a pressure range, e.g., up to 1 Torr, up to 50 mTorr, or up to 1000 Torr, respectively. In these experiments, only manometer 729 was used.

After the chamber is backfilled, contaminants, if any, can be introduced into the chamber via gas line 725. The contaminants, e.g., toluene, are introduced so as to attempt to induce CELID on optic 702 in a manner that simulates CELID on optics in other enclosed laser systems, e.g. space-based systems. The contaminants are disposed within temperature-controlled contaminant bubbler 730, and may be introduced into the chamber by opening bubbler valve 731. Once bubbler valve 731 is opened, gas from gas source 711 flows through bubbler 730 via gas lines (not shown), causing the contaminant to flow into chamber 700. Approximately one hour was allotted to allow test chamber 700 to reach steady state.

2. Experimental Parameters

For each experiment, test apparatus 600 and test chamber 700 were utilized. After a high level vacuum was achieved and the proper gas phase additives were introduced, bare or F-SAM coated optic 702 was exposed to beam 641 until the transmitted energy of Nd:YAG laser beam 631 as measured by energy meter 695 fell to 80% of its starting value or until $1\times10^6$ laser pulses were reached. If Nd:YAG laser 630 generated $1\times10^6$ laser pulses at 20 Hz and the transmitted energy did not fall to 80% of its starting value, each experiment lasted 13.9 hours. The pulse energy of Nd:YAG laser 630 was adjusted using a combination of partial reflectors and adjusting the Q-switch timing. The pulse width of Nd:YAG laser 630 was measured to be 13 ns from a digitizing oscilloscope (not shown) and a fast photodiode (not shown). Each experiment was repeated at least nine times for each bare or F-SAM coated optic 702 and each set of conditions. Optic 702 was automatically translated vertically in approximately 5 mm steps via the fixture and beam 641 was translated approximately 1 cm to create two columns of at least nine exposure spots across optic 702. After optic 702 received nine to ten exposure spots, a different, virtually identical optic 702 was utilized for experimentation.

3. Laser Induced Damage Threshold of Bare Optic, without Contaminant

Figure 8:
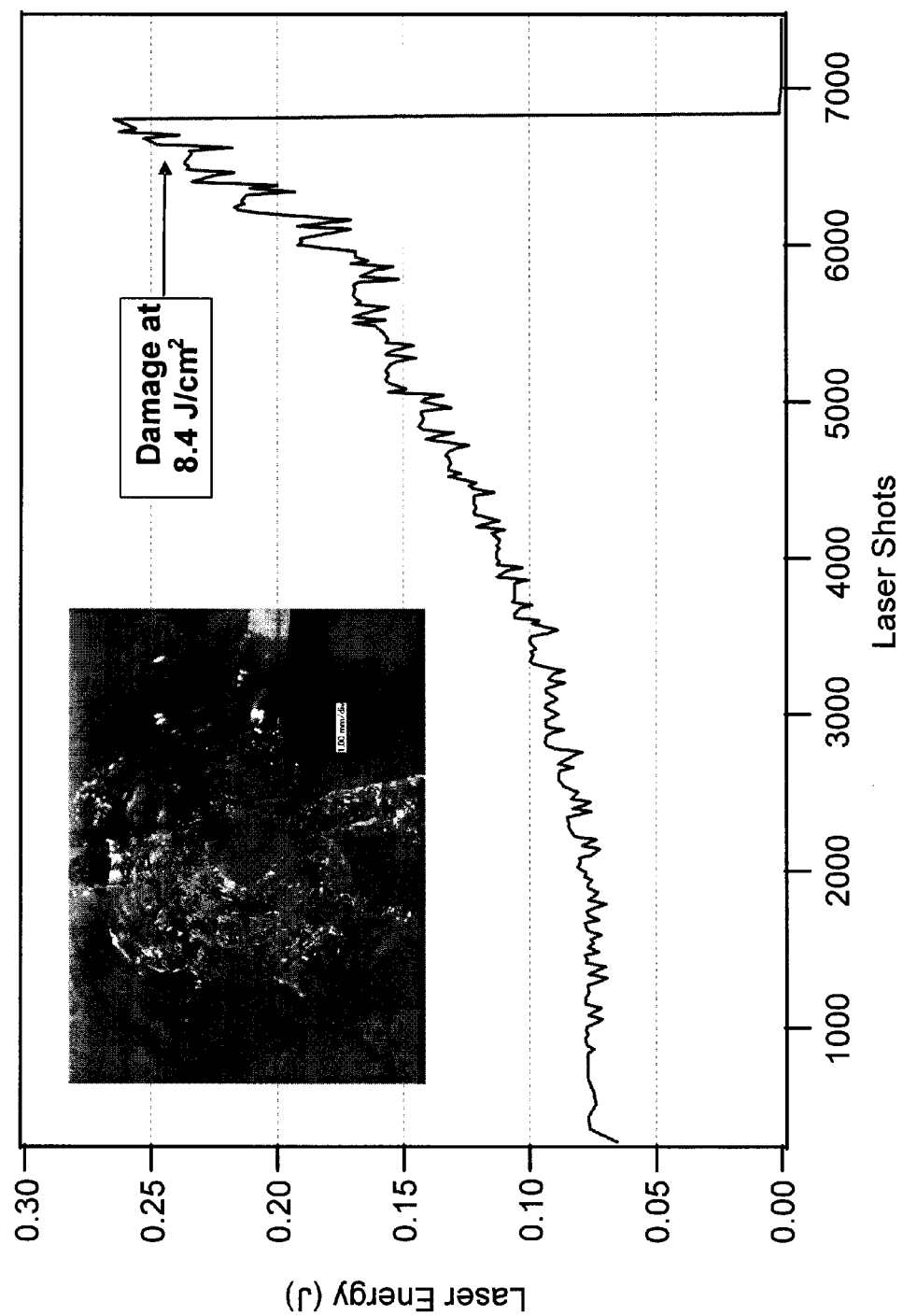
FIG. 8 is a plot illustrating the results of a laser induced damage threshold (LIDT) measurement performed on a bare fused silica optic under varying laser fluence without any introduced contaminant in the test chamber; inset is a photographic image of the damaged optic.

FIG. 8 illustrates the results of a LIDT measurement performed on a bare fused silica optic 702 under varying laser fluence without any introduced contaminant in test chamber 700. In this experiment, beam 641 was focused behind optic 702 to give a beam diameter at optic 702 of about 2 mm. FIG. 8 shows a plot of the laser energy in Joules of Nd:YAG laser 630 as measured by energy meter 695 versus the number of laser pulses, and an image of the laser ablation. As seen in FIG. 8, bare fused silica optic 702 was stable until the laser fluence reached approximately 8.4 J/cm². At this value, the power became high enough to cause laser ablation, cracking and breaking the surface of optic 702 within a few seconds. The inset of FIG. 8 is an image of this laser ablation, showing a hole that went completely through optic 702 that was the size of the beam diameter. The image further shows that at the edge of optic 702, there was cracking and breaking of optic 702.

4. Laser Induced Damage Threshold of Bare Optic, with Contamination

Another experiment determined the LIDT of a bare fused silica optic 702 with a contaminant in the test chamber 700. The chosen contaminant was toluene. The selected transmitted energy of the Nd:YAG laser 630 was 85 mJ, making the fluence approximately 4 J/cm². This fluence was chosen as it was lower than the measured LIDT of the optic, as discussed above with respect to FIG. 8, and is typical of fluences used in space flight laser systems.

The experiment included preparing test apparatus 600 and test chamber 700 as described above with respect to vacuum achievement, and introducing toluene from contaminant bubbler 730 mixed with 80% nitrogen ($N_2$) and 20% oxygen ($O_2$) from gas source 711. After the experiment was performed, plots were created showing the normalized transmitted energy versus the number of laser pulses (also referred to as "shots") to damage. The damage threshold was then calculated as the average number of laser shots, including error, required to cause a 10% drop in transmitted laser energy, defined to be a "failure" of the optic.

FIG. 9A is a plot illustrating the normalized transmitted energy for a series of threshold measurements performed on a bare fused silica optic 702 in a flowing mixture of toluene in synthetic air (80% nitrogen and 20% oxygen). The concentration of toluene in the flowing mixture was 600 parts per million (ppm). The result of this experiment was a calculated damage threshold for optic 702 in the flowing mixture of toluene in synthetic air of $(1.8\pm0.2)\times10^4$ shots. FIG. 9B is an image of a damage site produced on optic 702 from one threshold measurement described in FIG. 9A. As seen in FIG. 9B, the toluene contaminant caused damage to bare fused silica optic 702, creating a black ring structure that was not damaged in the center. The black ring was graphitic carbon as determined by Raman spectroscopy and, without wishing to be bound by any theory, the inventors attribute the black ring to radical formation from the toluene as a result of laser excitation.

Figure 10:
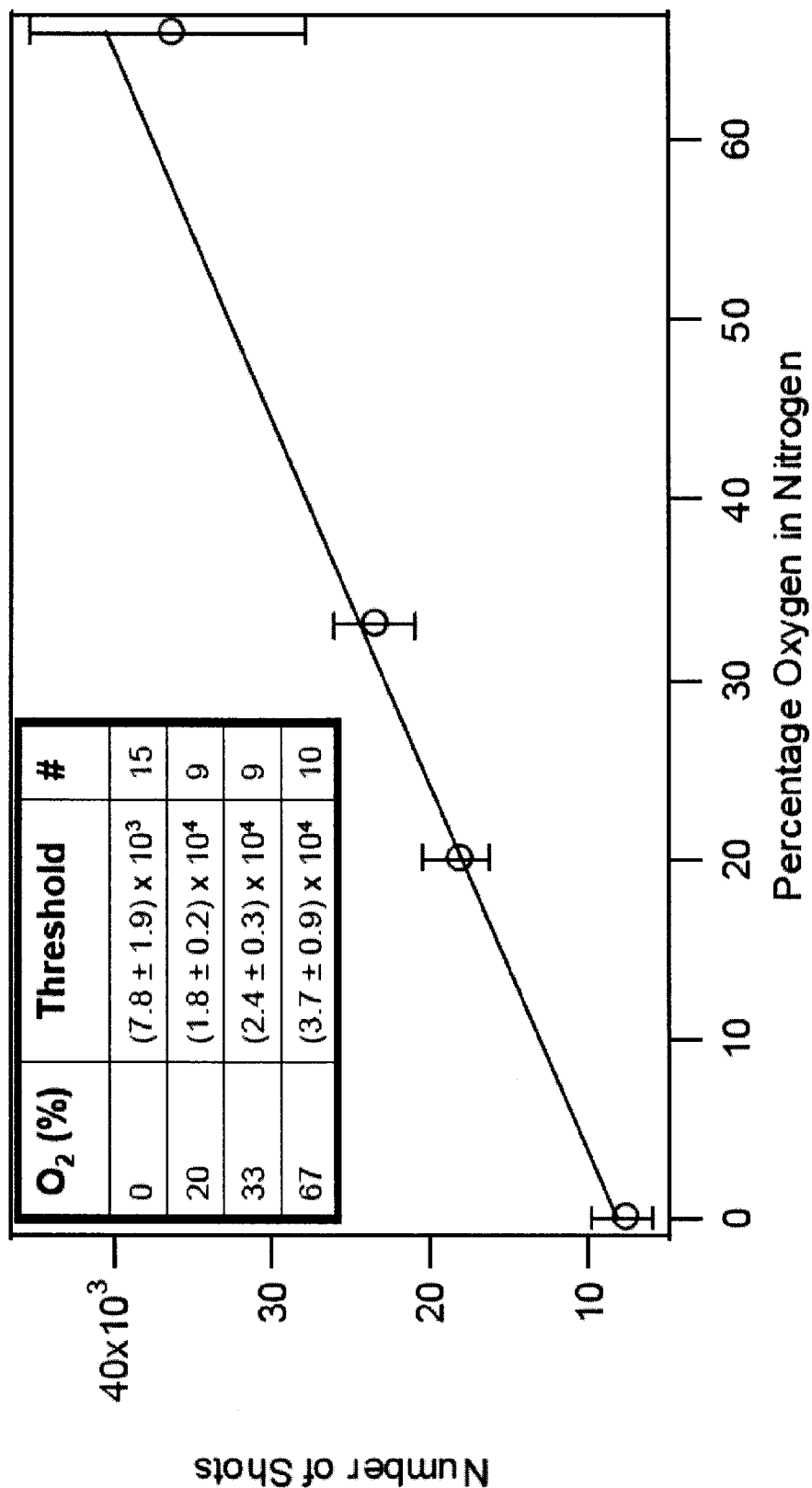
FIG. 10 is a plot illustrating the average number of laser shots measured to cause a 10% drop in transmitted laser energy performed on bare fused silica optics in varying percentages of oxygen in nitrogen, with error bars shown.

FIG. 10 is a plot illustrating the average number of laser shots measured to cause a 10% drop in transmitted laser energy performed on bare fused silica optics in varying percentages of oxygen in nitrogen, with error bars shown. The concentration of toluene in the flowing mixtures was 300 ppm. The calculated damage thresholds for varying percentages of oxygen in nitrogen are summarized in the table inset in FIG. 10. As seen in FIG. 10 and the table therein, the calculated damage threshold for a bare fused silica optic 702 increased as the percentage of oxygen in exposure chamber 701 increased. Without wishing to be bound by any theory, the inventors attribute this to the quenching and/or reactivity of oxygen with radicals that may be formed preventing soot formation.

Figure 11:
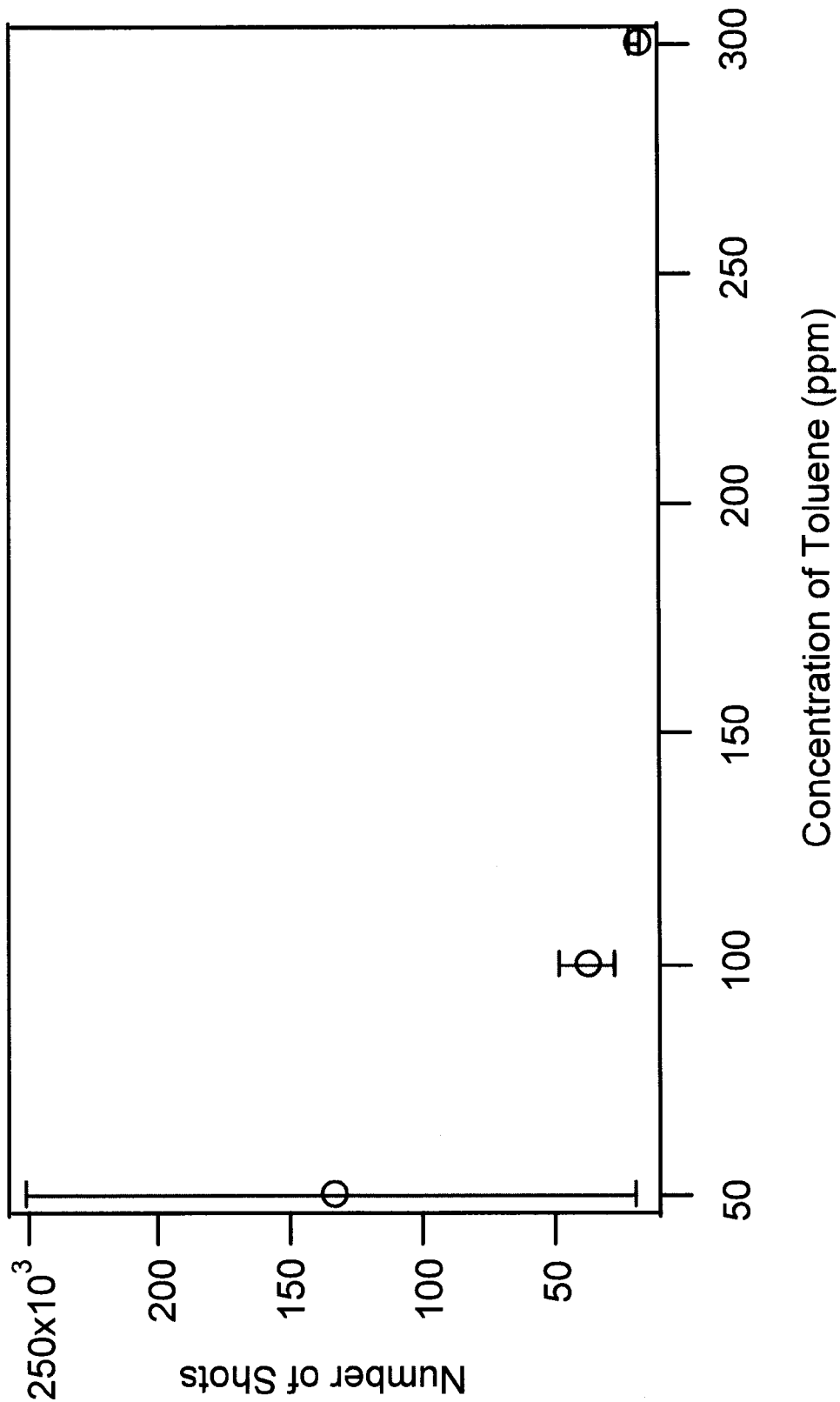
FIG. 11 is a plot illustrating the average number of laser shots measured to cause a 10% drop in transmitted laser energy performed on bare fused silica optics in varying concentrations of toluene in synthetic air, with error bars shown.

FIG. 11 is a plot illustrating the average number of laser shots measured to cause a 10% drop in transmitted laser energy performed on bare fused silica optics in varying concentrations of toluene in synthetic air, including error bars. The calculated damage thresholds for varying concentrations of toluene in synthetic air are summarized in TABLE 1.

TABLE 1

| Toluene Concentration (ppm) | Calculated Damage Threshold (shots) | Number of Experiments |
|---|---|---|
| 50 | $(1.3 \pm 1.2) \times 10^5$ | 9 |
| 100 | $(3.8 \pm 1.0) \times 10^4$ | 10 |
| 300 | $(1.8 \pm 0.2) \times 10^4$ | 9 |

As seen in FIG. 11 and TABLE 1, the calculated damage threshold for a bare fused silica optic 702 decreased as the toluene concentration in exposure chamber 701 increased. FIG. 11 verifies that toluene induces damage on optics. There was a large error in the calculated damage threshold at 50 ppm which, without wishing to be bound by any theory, the inventors attribute to inadequate temperature control of contaminant bubbler 730.

5. Laser Induced Damage Threshold with Contaminant and F-SAM

Figure 12A:
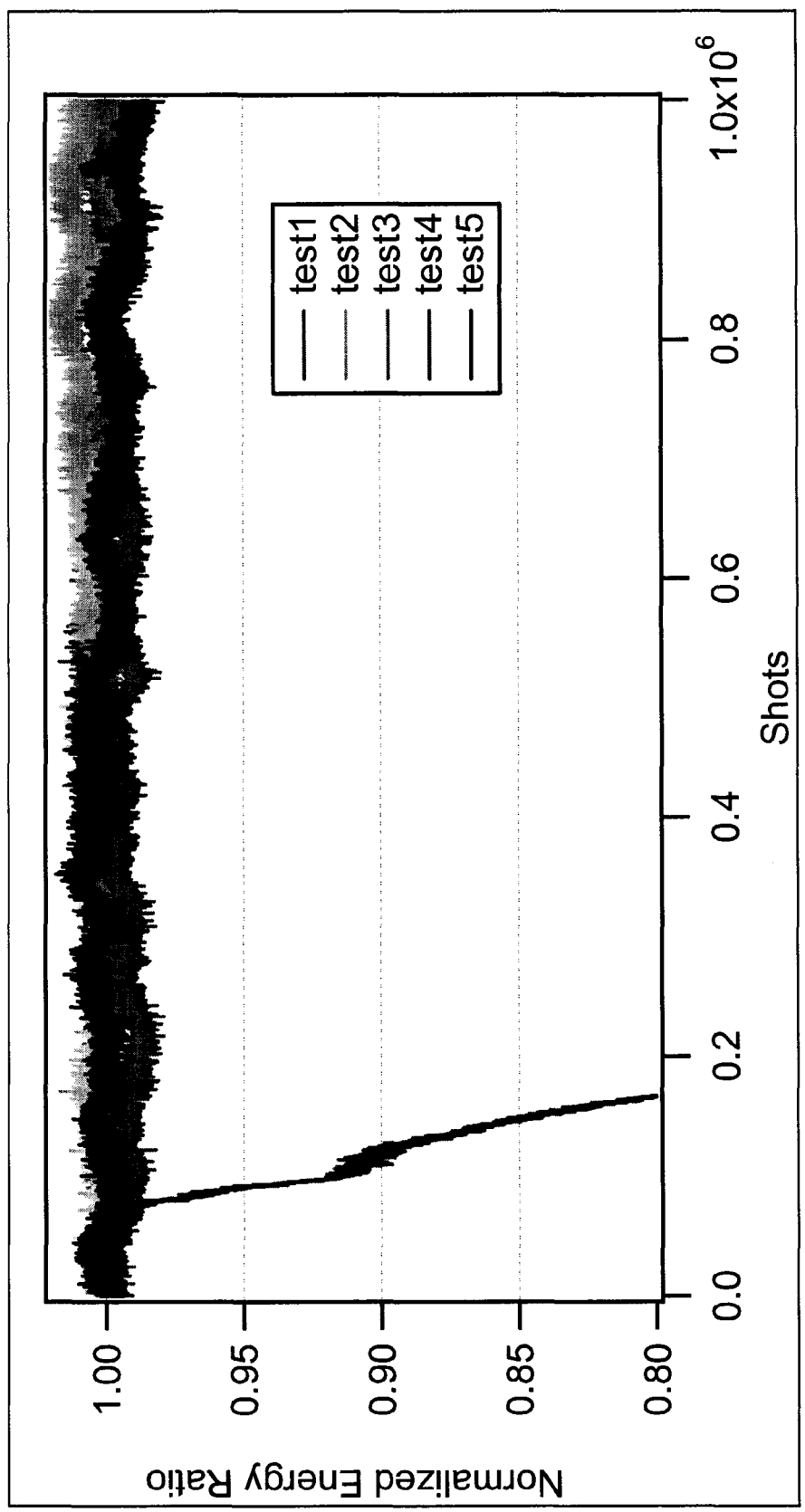
FIG. 12A is a plot illustrating the normalized transmitted energy for a series of threshold measurements performed on a fused silica optic coated with an F-SAM exposed to toluene in synthetic air.
Figure 12B:
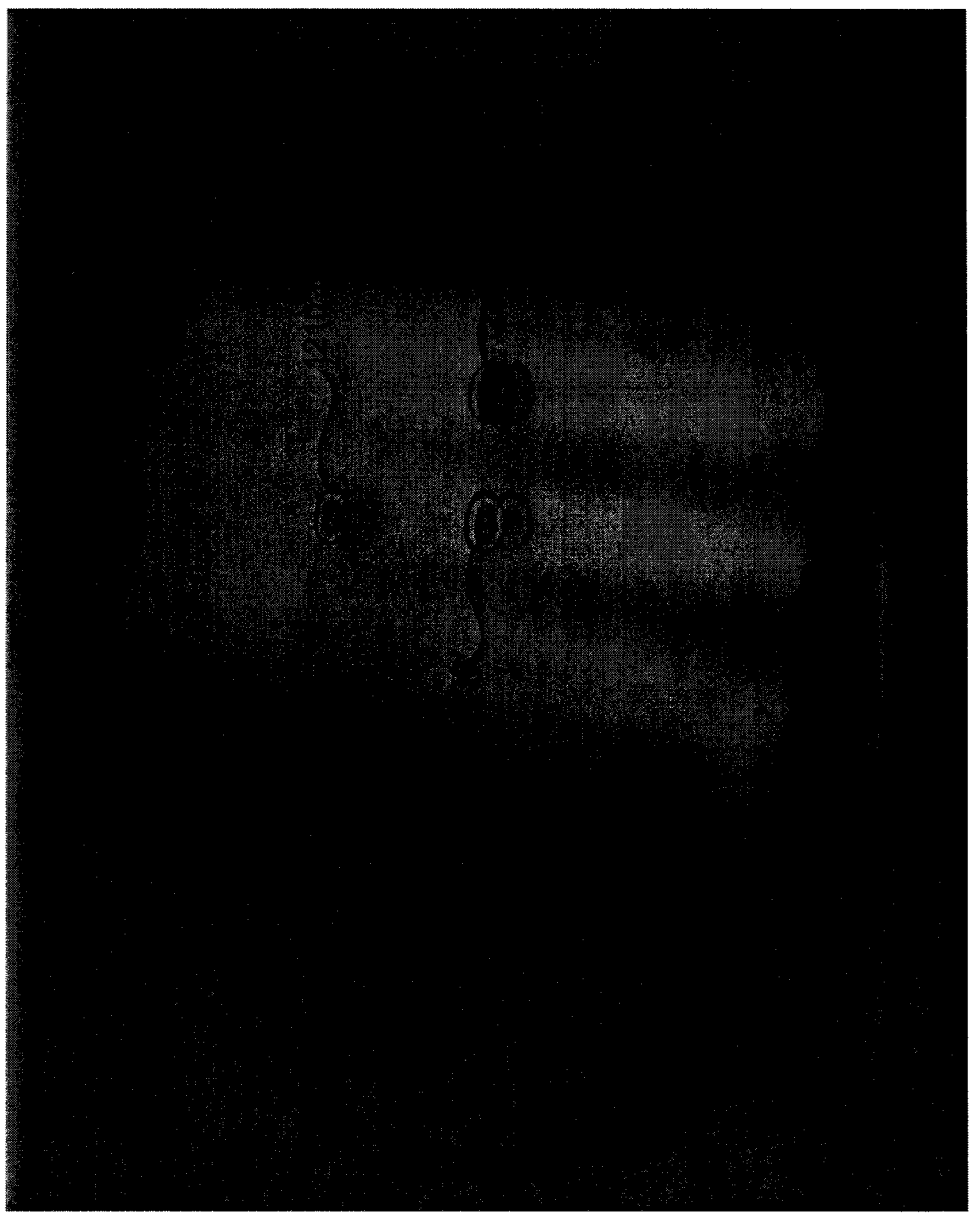
FIG. 12B is a photographic image of the F-SAM coated fused silica optic of FIG. 8A following the measurements plotted in FIG. 8A.

FIG. 12A is a plot illustrating the normalized transmitted energy for a series of threshold measurements performed on a fused silica optic coated with the above-described F-SAM in a flowing mixture of 300 ppm toluene in synthetic air (80% nitrogen and 20% oxygen), with a laser fluence of about 3.3 J/cm². In this experiment, F-SAM coated optic 702 was observed to last for greater than $1\times10^6$ shots in four out of five experiments. Without wishing to be bound by any theory, the inventors attribute the experiment where the normalized transmitted energy fell below 90% at 119,610 shots to particulate contamination. The experiment was repeated a total of ten times (additional results not shown in FIG. 12A) and it was observed that the F-SAM coated optic 702 lasted for greater than $1\times10^6$ shots in seven out of the ten experiments, and failed in the other three experiments. FIG. 12B is an image of three damage sites 1210, 1220, 1230 produced on F-SAM coated optic 702 during the three experiments in which the optic failed. Without wishing to be bound by theory, it is believed that the failures resulted from particulate contamination in the experimental setup, which readily may be addressed by preparing the experiment in a clean room environment having sufficiently low particulate levels. Additionally, it should be noted that if an F-SAM coated optic were to fail at approximately 120,000 shots, the optic would have survived for at least 500 times more shots than a bare optic would be expected to survive.

Accordingly, it may be seen that the F-SAM coatings, methods, and systems provided herein suitably may be used to inhibit CELID. The F-SAMs suitably may be prepared using gas-phase deposition techniques such as described above with reference to FIG. 1, which techniques readily may be adapted to deposit F-SAMs on any type of optical component, including components with complex features such as microlens arrays, and including relatively large optical components such as lenses or mirrors for use in telescopes or laser-fusion systems. Indeed, the F-SAM coatings, methods, and systems provided herein suitably may be used in a wide range of enclosed-housing laser applications, including space-based laser applications. These applications may include, but are not limited to, laser ranging, laser altimetry, light detection and ranging (LIDAR), laser communications, laser sensing, and/or laser power beaming. Other applications may include medical lasers for surgery and other procedures, and high power lasers for laser fusion, military defense systems, and cutting or etching. The F-SAM coatings, methods, and systems provided herein also may be applied in non-enclosed laser applications, e.g., may be used to inhibit contamination of non-enclosed optics, including optics within space-based optical systems and detectors, or may be used to inhibit photofixation by UV radiation such as from the sun or short wavelength photolithography. Indeed, an F-SAM coating suitably may be applied to objects formed of any material, including glasses such as silica, metals such as aluminum, gold, or silver, polymers, semiconductors such as silicon, zinc selenide (ZnSe), gallium arsenide (GaAs), indium phosphide (InP), or gallium phosphide (GaP), laser gain media such as Nd-doped glass or Ti:sapphire, and crystalline materials such as sapphire. Such objects suitably may be coated with a layer that facilitates covalent bonding to the F-SAM, e.g., may be coated with an oxide coating such as silica so as to facilitate covalent bonding to a siloxane-based F-SAM. In one illustrative example, an F-SAM coating suitably may be applied to a silicon-based charge-coupled device (CCD) so as to inhibit contamination of the CCD.

While preferred embodiments of the invention are described herein, it will be apparent to one skilled in the art that various changes and modifications may be made. For example, although the F-SAMs provided herein have primarily been described as being prepared using gas-phase deposition techniques, it should be apparent that the F-SAMs suitably may be prepared using other self-assembly techniques. For example, a monolayer of a fluorinated precursor may be prepared a liquid surface, e.g., within a Langmuir-Blodgett trough, and the optic drawn through the monolayer at a rate sufficient for the monolayer to covalently bond to the optic so as to form an F-SAM disposed on the optic. The appended claims are intended to cover all such changes and modifications that fall within the true spirit and scope of the invention.

What is claimed:

1. A coating for inhibiting contamination enhanced laser induced damage (CELID) to an optic disposed in a sealed gas environment or vacuum, the coating comprising a fluorinated self-assembled monolayer (F-SAM) including a fluorinated hydrocarbon tail group covalently bound to the optic via a head group, the coating inhibiting CELID to the optic.

2. The coating of claim 1, wherein the coating is formed by heating the optic and a liquid-phase precursor of the F-SAM to generate a gas-phase precursor, and exposing the heated optic to the gas-phase precursor for a period of time sufficient for the gas-phase precursor to coalesce at and covalently bond to the optic and form the F-SAM.

3. The coating of claim 1, having a contact angle with water of about 100 degrees or greater and a contact angle with toluene of about 50 degrees or greater.

4. The coating of claim 1, wherein the optic comprises silica, and wherein the head group comprises a siloxane group covalently bound to the silica.

5. The coating of claim 1, wherein the tail group has the general structure:

$$CF_3-(CF_2)_n-(CH_2)_q-,$$

where n is zero or an integer, and
q is an integer.

6. The coating of claim 5, wherein n is between zero and twenty, q is an integer less than twenty, and n+q is twenty or less.

7. The coating of claim 6, wherein n is between five and ten, and q is between two and four.

8. A system with enhanced resistance to contamination enhanced laser induced damage (CELID), the system comprising:
a housing defining a sealed gas environment or vacuum;
a laser defining an optical path through the sealed gas environment or vacuum;
an optic disposed within the housing and in the optical path of the laser; and
a coating disposed on the optic, the coating comprising a fluorinated self-assembled monolayer (F-SAM) including a fluorinated hydrocarbon tail group covalently bound to the optic by a head group, the coating inhibiting CELID to the optic.

9. The system of claim 8, wherein the coating is formed by heating the optic and a liquid-phase precursor of the F-SAM to generate a gas-phase precursor, and exposing the heated optic to the gas-phase precursor for a period of time sufficient for the gas-phase precursor to coalesce at and covalently bond to the optic and form the F-SAM.

10. The system of claim 8, wherein the coating has a contact angle with water of about 100 degrees or greater and a contact angle with toluene of about 50 degrees or greater.

11. The system of claim 8, wherein the optic comprises silica, and wherein the head group comprises a siloxane group covalently bound to the silica.

12. The system of claim 8, wherein the fluorinated hydrocarbon tail group has the general structure:

$$CF_3-(CF_2)_n-(CH_2)_q-,$$

where n is zero or an integer, and
q is an integer.

13. The system of claim 12, wherein n is between zero and twenty, q is an integer less than twenty, and n+q is twenty or less.

14. The system of claim 13, wherein n is between five and ten, and q is between two and four.

15. The system of claim 8, further comprising a container configured to introduce a gas phase additive to the sealed gas environment or vacuum in an amount sufficient to further inhibit CELID to the optic.

16. The system of claim 15, wherein the gas phase additive comprises water or an alcohol.

17. A method for inhibiting contamination enhanced laser induced damage (CELID) to an optic, the method comprising:
disposing on the optic a coating comprising a fluorinated self-assembled monolayer (F-SAM) including a fluorinated hydrocarbon tail group covalently bound to the optic via a head group;
disposing the optic with the coating disposed thereon within a housing defining a sealed gas environment or vacuum and along an optical path of a laser; and
transmitting light from the laser through or reflecting light from the laser from the optic with the coating disposed thereon substantially without CELID.

18. The method of claim 17, wherein the coating is disposed on the optic by heating the optic and a liquid-phase precursor of the F-SAM to generate a gas-phase precursor, and exposing the heated optic to the gas-phase precursor for a period of time sufficient for the gas-phase precursor to coalesce at and covalently bond to the optic and form the F-SAM.

19. The method of claim 18, wherein the liquid-phase precursor has the general structure:

$$CF_3-(CF_2)_n-(CH_2)_q-SiX_pY_{3-p},$$

where n is zero or an integer,
q is an integer,
X is an alkoxy group,
Y is a halogen, and
p is zero or an integer between one and three.

20. The method of claim 19 wherein n is between zero and twenty, q is an integer less than twenty, and n+q is twenty or less.

21. The method of claim 20, wherein n is between five and ten, q is between two and four, Y is Cl, and p is zero.

22. The method of claim 17, wherein the coating has a contact angle with water of about 100 degrees or greater and a contact angle with toluene of about 50 degrees or greater.

23. The method of claim 17, wherein the optic comprises silica, and wherein the head group comprises a siloxane group covalently bound to the silica.

24. The method of claim 17, further comprising introducing a gas phase additive to the sealed gas environment or vacuum in an amount sufficient to further inhibit CELID to the optic.

25. The method of claim 24, wherein the gas phase additive comprises water or an alcohol.

26. The coating of claim 1, wherein the head group comprises a thiolate or a phosphonate.

27. The system of claim 8, wherein the head group comprises a thiolate or a phosphonate.

28. The method of claim 17, wherein the head group comprises a thiolate or a phosphonate.

\* \* \* \* \*